United States Patent [19]

Cullen et al.

[11] Patent Number: 4,650,957
[45] Date of Patent: Mar. 17, 1987

[54] VOLTAGE CONTROL SYSTEM

[75] Inventors: Richard Cullen; Randolph A. Koploy; Thomas S. Thorvick, all of San Diego; Donald A. Westman, El Cajon, all of Calif.

[73] Assignee: Cyclomatic Industries, Inc., San Diego, Calif.

[21] Appl. No.: 727,421

[22] Filed: Apr. 29, 1985

[51] Int. Cl.[4] .............................................. B23K 9/12
[52] U.S. Cl. ................................. 219/124.03; 364/162
[58] Field of Search ....................... 219/124.03, 124.02, 219/124.34; 901/42; 364/162; 365/229

[56] References Cited

U.S. PATENT DOCUMENTS

| | | | |
|---|---|---|---|
| 3,770,946 | 11/1973 | Fertik et al. | 364/162 |
| 3,980,935 | 9/1976 | Worst | 365/229 |
| 4,232,377 | 11/1980 | Tallman | 365/229 |
| 4,363,468 | 12/1982 | Noe | 219/124.03 |
| 4,441,009 | 4/1984 | Toohey | 219/124.03 |
| 4,477,713 | 10/1984 | Cook et al. | 219/124.34 |
| 4,531,192 | 7/1985 | Cook | 901/42 |

OTHER PUBLICATIONS

A. C. Leenhouts, "Stepping Motors in Industrial Motion Control, "*Proc. of the* 1980 *Joint Automatic Control Conf.*, vol. 1, 1980.
D. R. Polk, "Simplified Design of MP Compensators for Digital Servo Systems", 9th *Annual Symposium on Incremental Motion Control Systems Devices*, (6/1980).
E. H. Bristol, "Strategic Design: A Practical Chapter in a Textbook On Control ", *Proc. of the* 1980 *Joint Automation Control Conf.*, vol. I, (8/1980).
Sigma Instruments, Inc., *Sigma Stepping Motor Handbook*, (1972).
M. R. Stojic, "Design of the Microprocessor–Based Digital System for D.C. Motor Speed Control", *IEEE Transactions on Industrial Electronics*, vol. IE–31, #3, 8/1984, pp. 243-248.
"Welding Automation, Power Supplies and Accessories" by Cyclomatic Industries, Inc. of San Diego, CA., First published Apr., 1985.
"Arc Voltage Control Systems" by Cyclomatic Industries, Inc. Published Jun. 19, 1982.
"Welding Eccentric Parts Requires Losts of Smarts", Jetline Engineering Inc., of Irbine, CA. *Welding Journal/91*, data unknown.
Thruarc TM "Family on Non-Contacting Adpative Positioning Control Seam Trackers" The Merrick Corporation.
"A Self-Regulating System to Maintain Constant Torch Height During Traverse of the Welding Torch or Workpiece" GEC Robot Systems Limited, AWP Division, Warwickshire, England.
"ACCU-TRACK TM Positioning Controller and Weld Sequencer" by Lytron Engineering, Inc., of Sylmar, California.
"Arcair © Tektran Automatic Voltage Control System" Tektran Welding Products, Arcair Co. of Lancaster, Ohio, Aug. 1, 1975.

*Primary Examiner*—Clifford C. Shaw
*Attorney, Agent, or Firm*—Majestic, Gallagher, Parsons & Siebert

[57] ABSTRACT

The voltage between a work instrument and a workpiece varies with the distance between them. A microcoded controller is used to compare the voltage between the work instrument and the workpiece when the instrument moves relative to the workpiece, to generate a correction signal. The correction signal is the sum of a proportional term, a derivative term and an integral term. A servo means responds to the correction signal to correct the distance between the work instrument and the work piece so as to maintain the voltage between them at a set level. A battery-backed memory is used to store crucial parameters necessary for operating the automatic control system to prevent loss of the parameters from the controller memory caused by power interruptions. A stepper motor operating in either the full of half step mode may be used to move the work instrument away from or towards the work piece in response to the correction signal.

14 Claims, 13 Drawing Figures

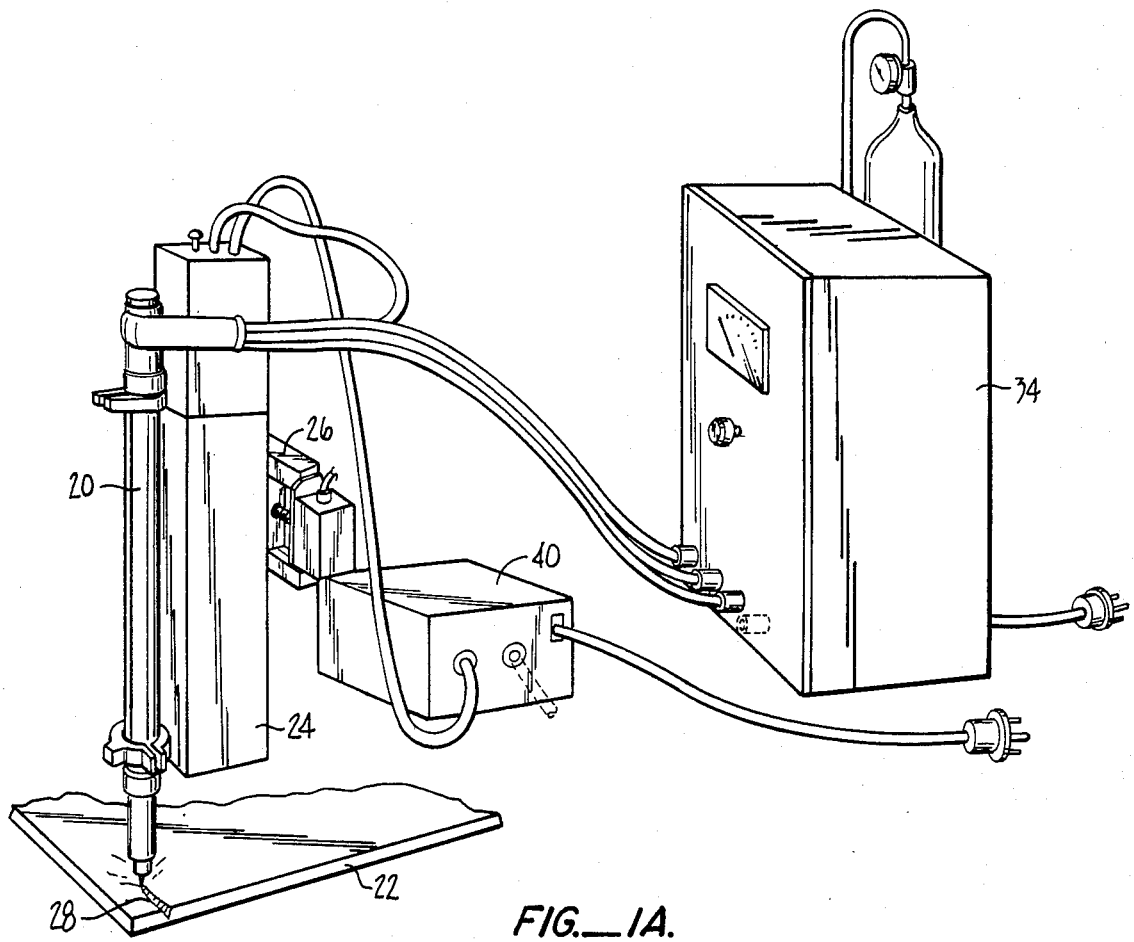
FIG._1A.
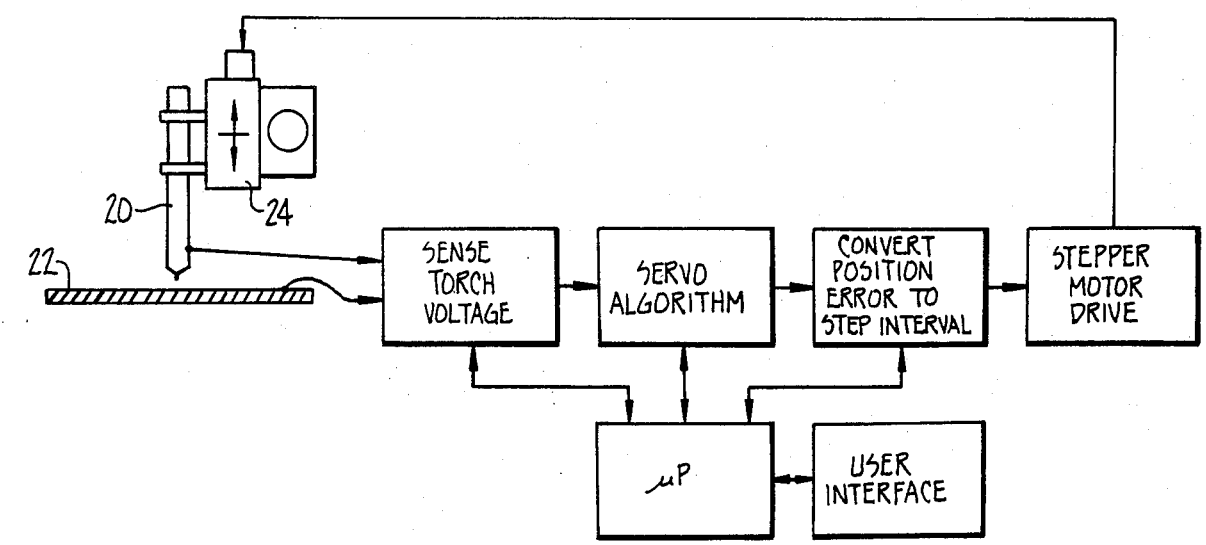
FIG._2.

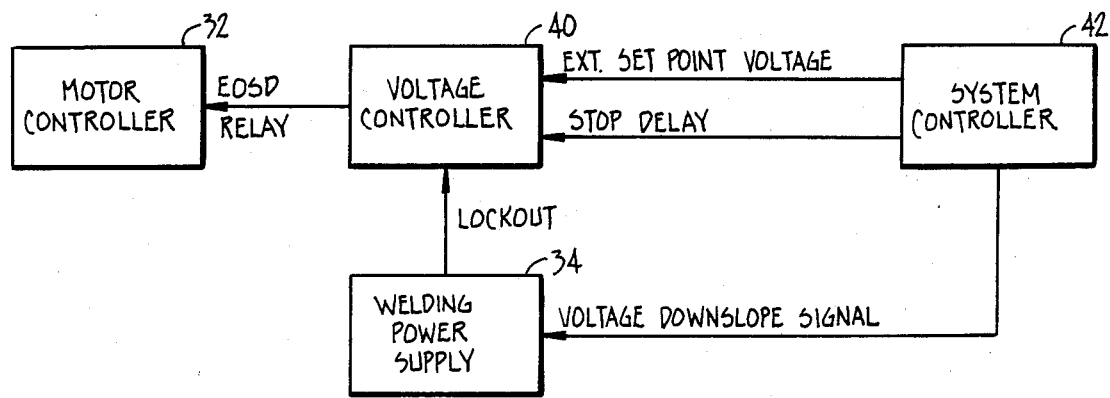
FIG._1B.

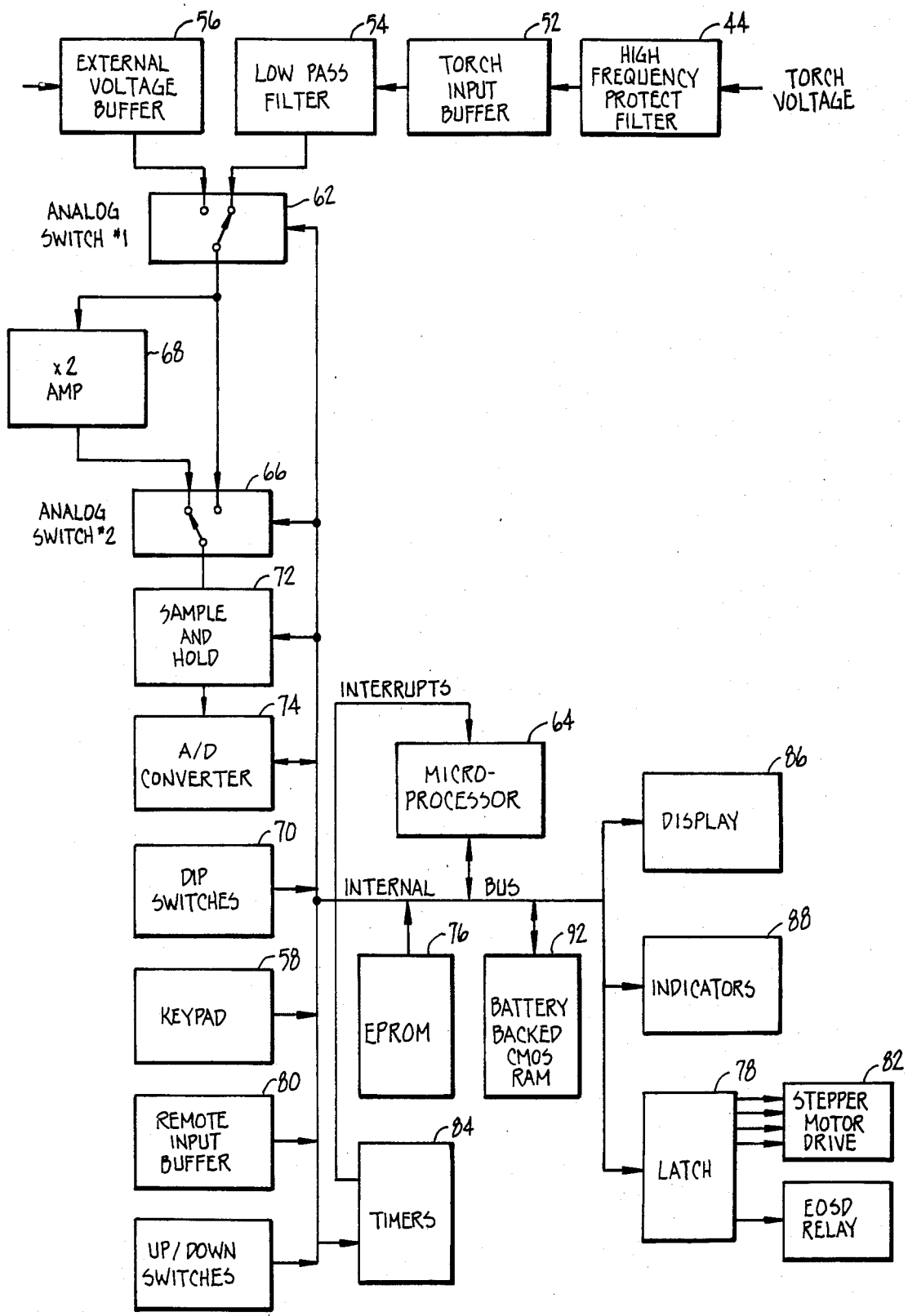
FIG._3.

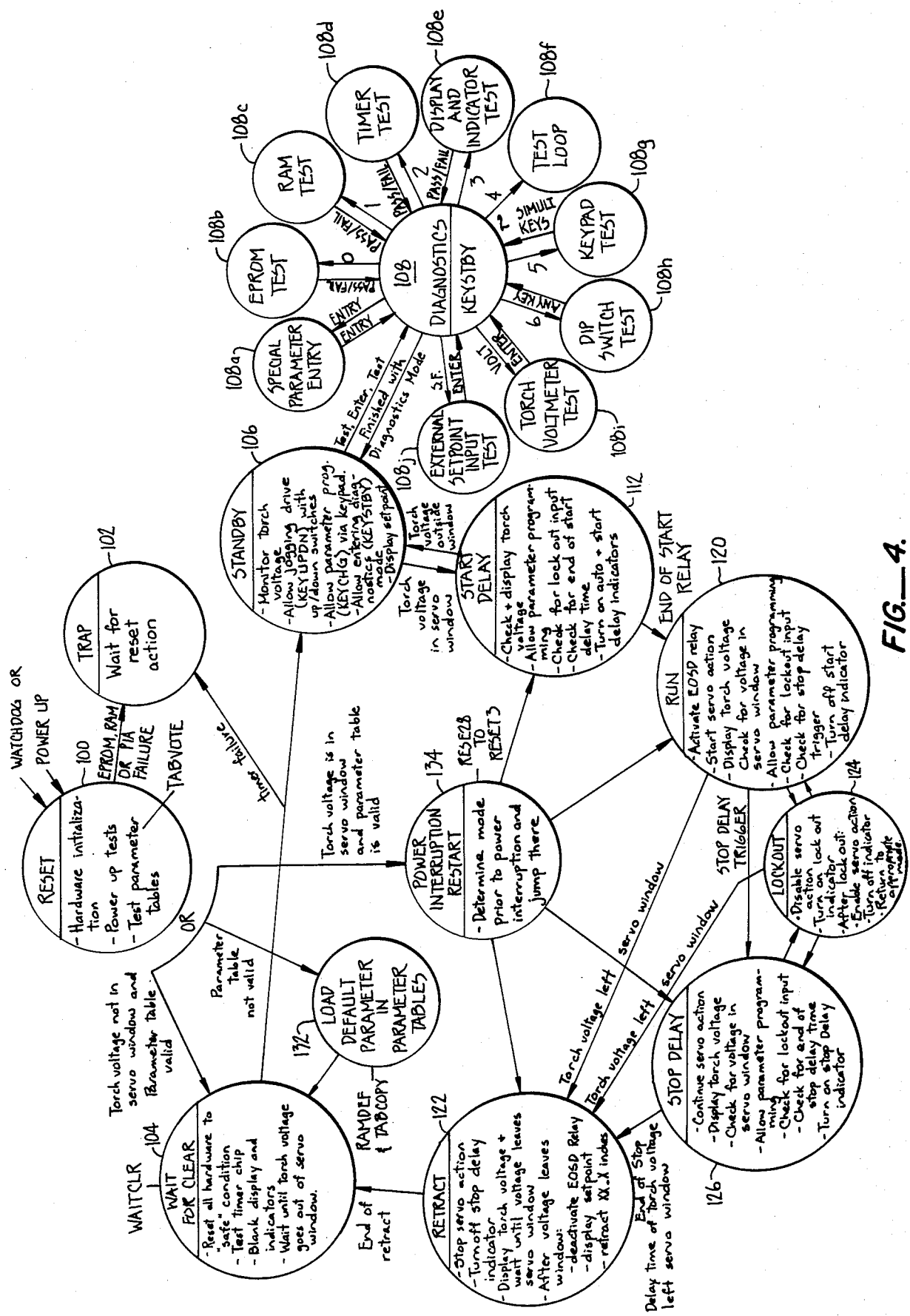
FIG._4.

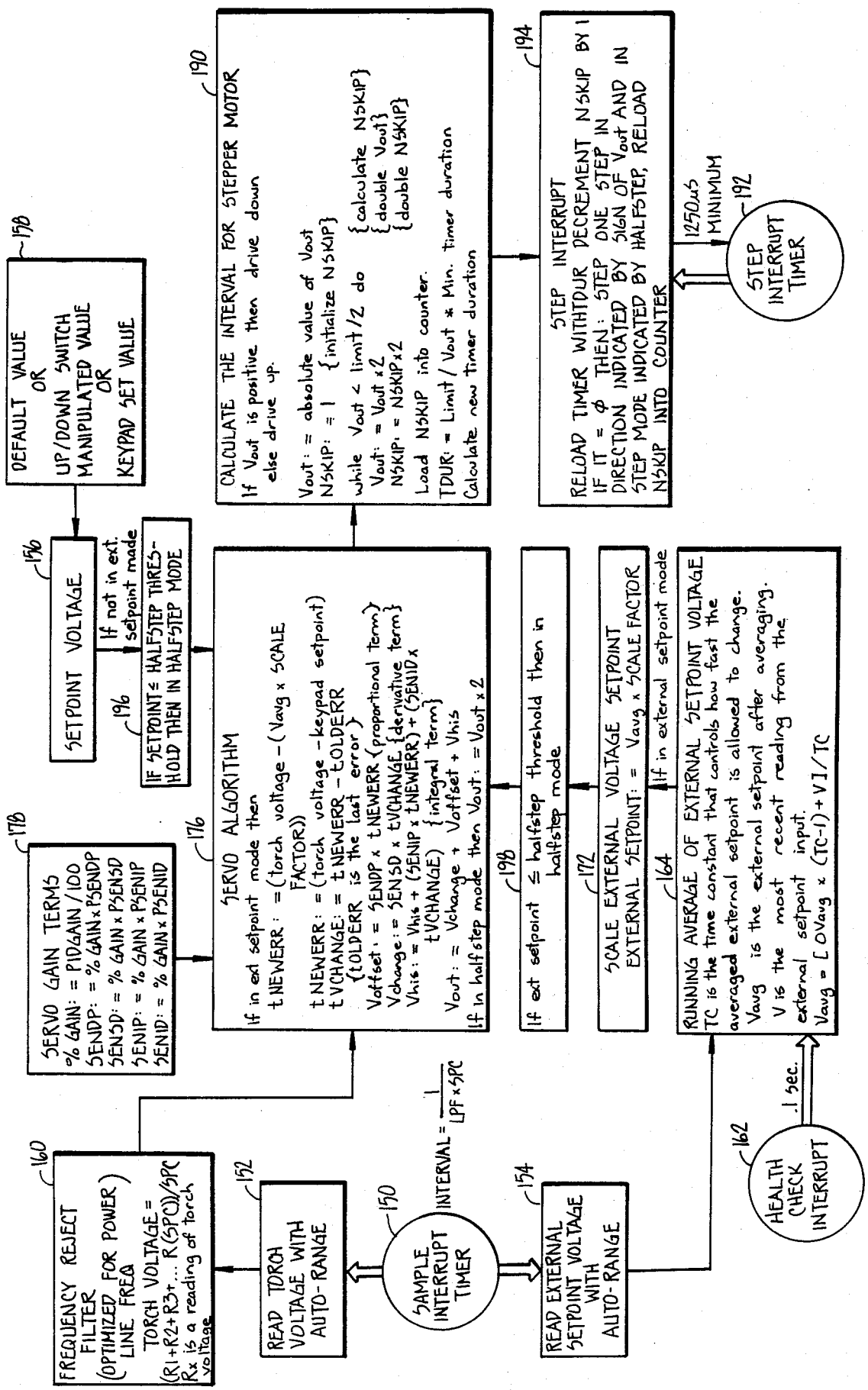
FIG._5.

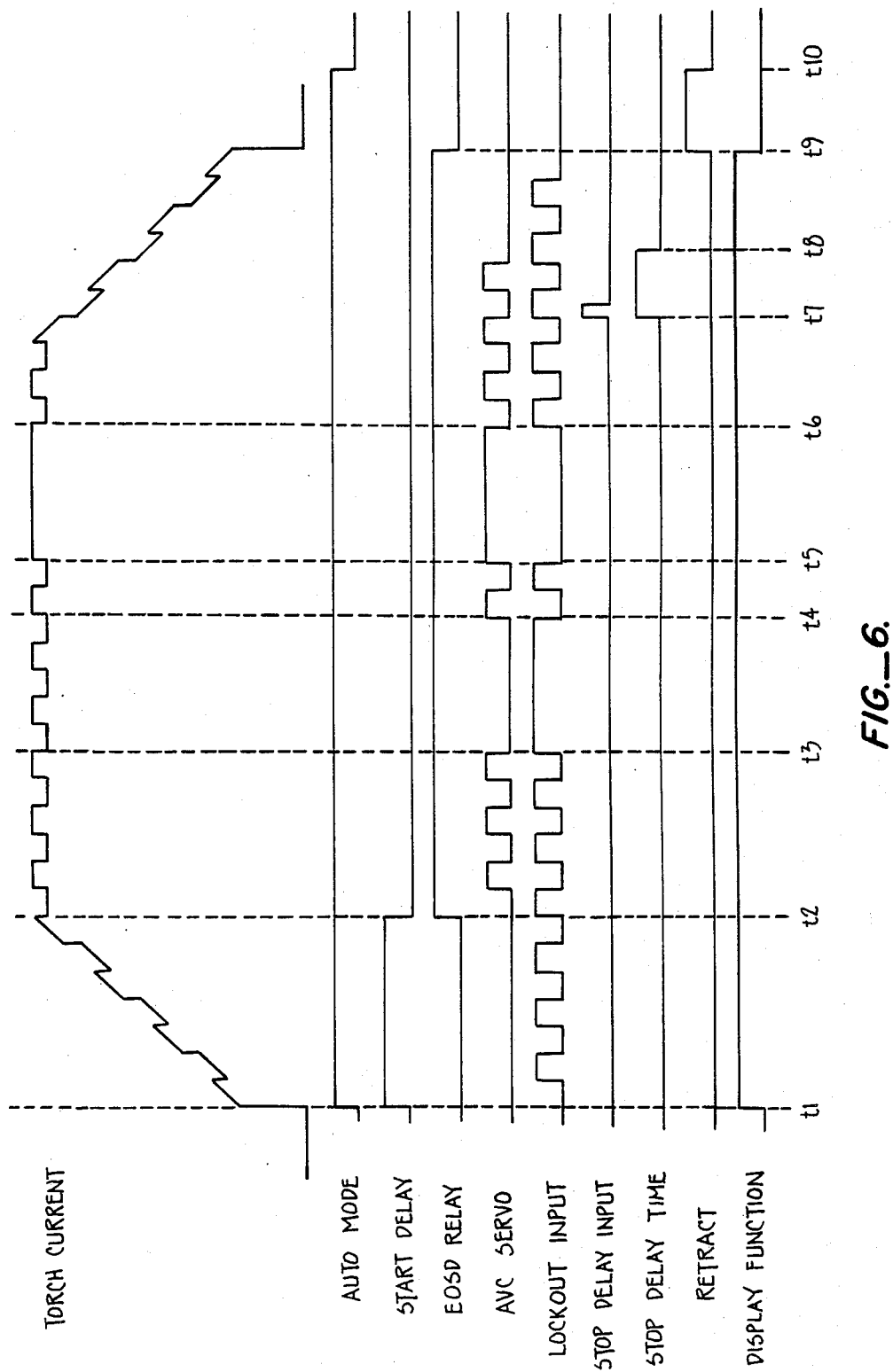

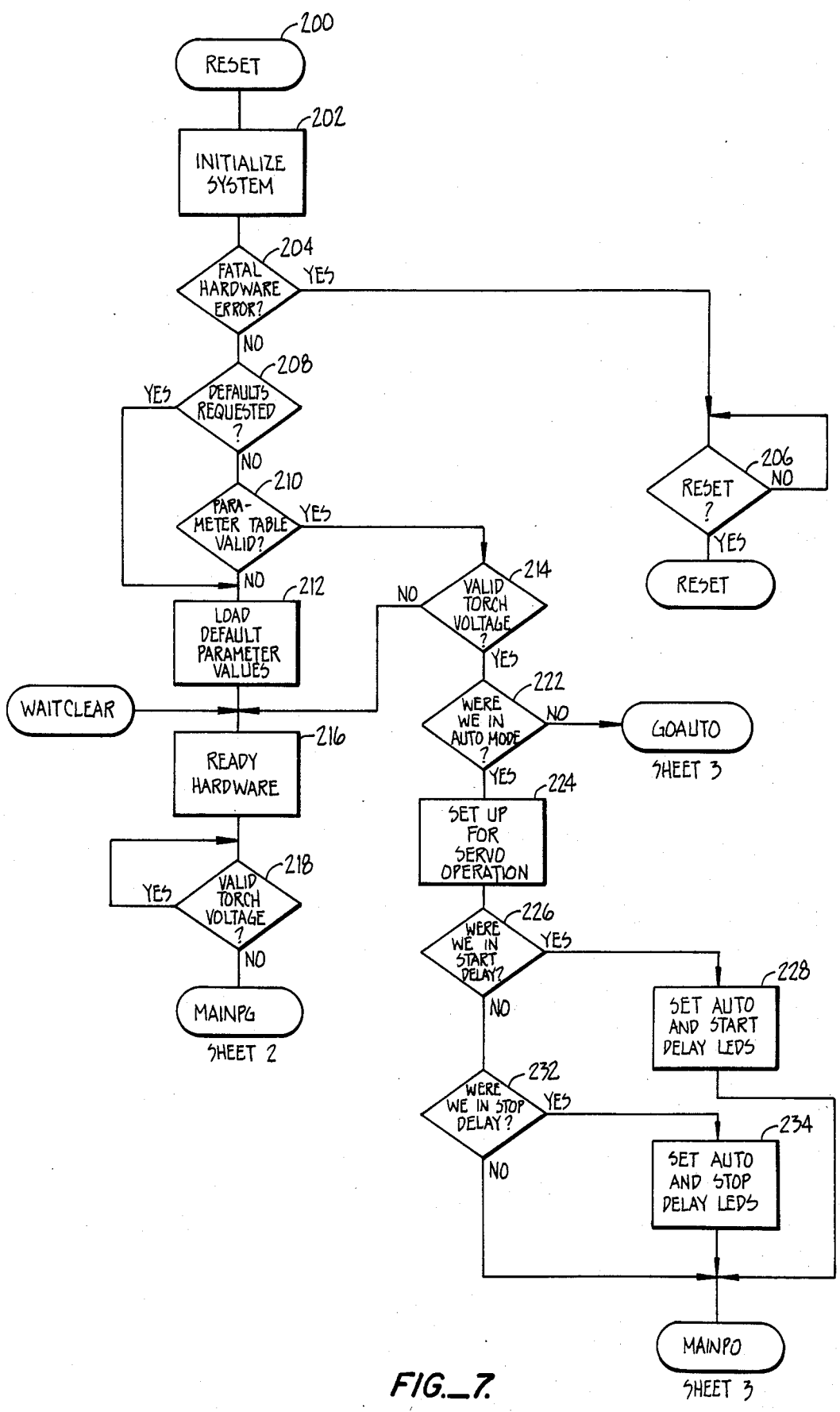
FIG._7.

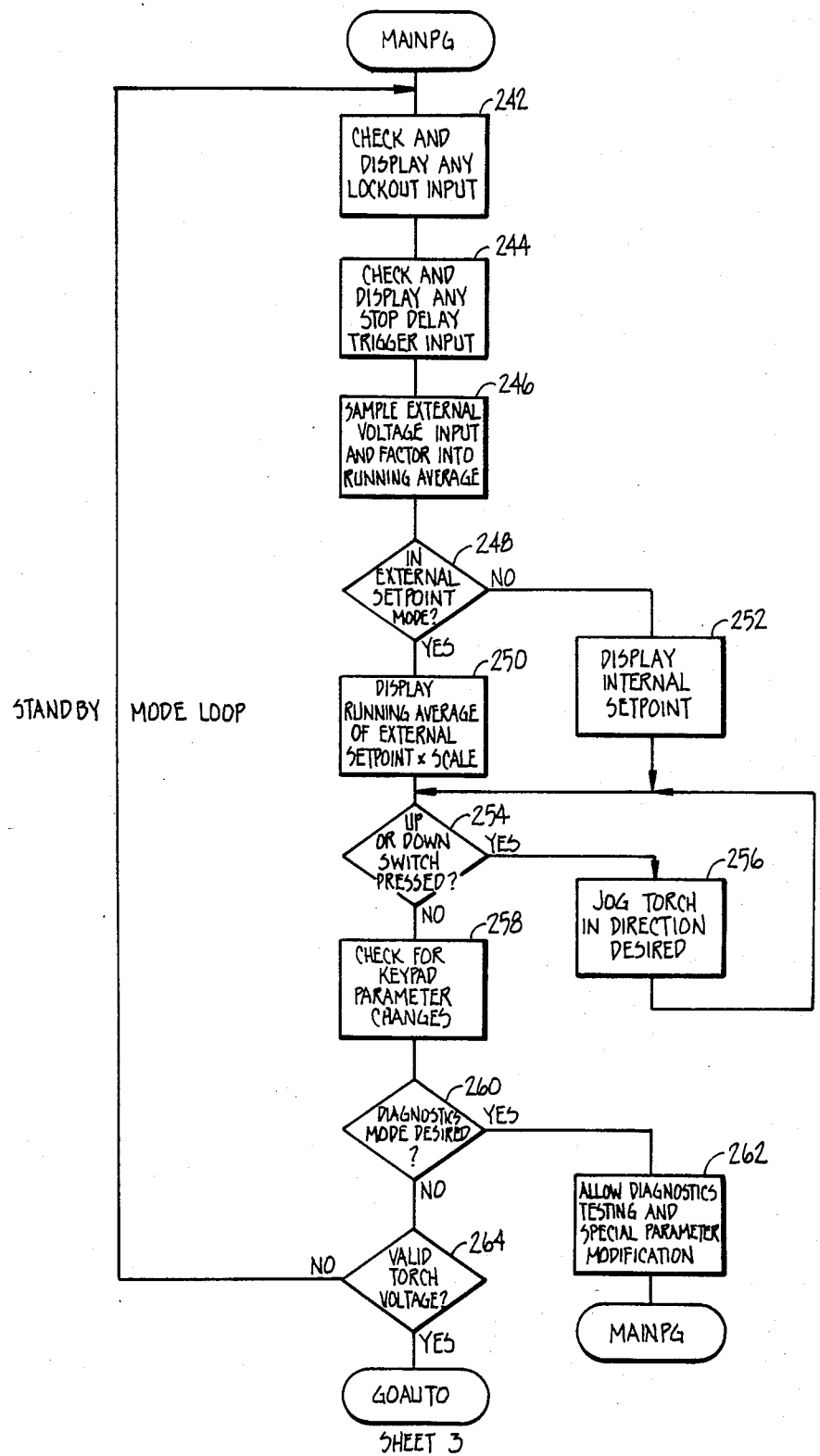
FIG._8.

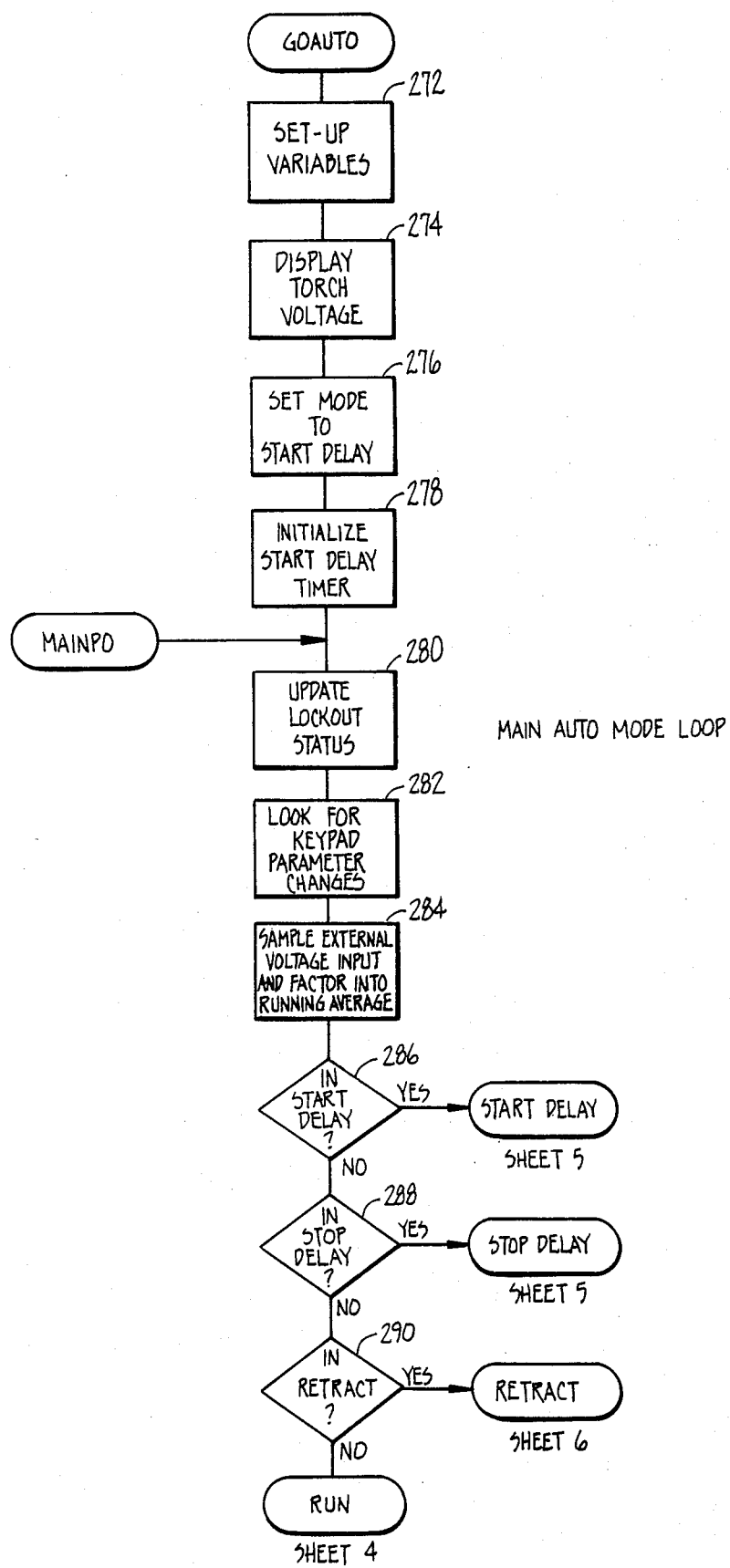
FIG._9.

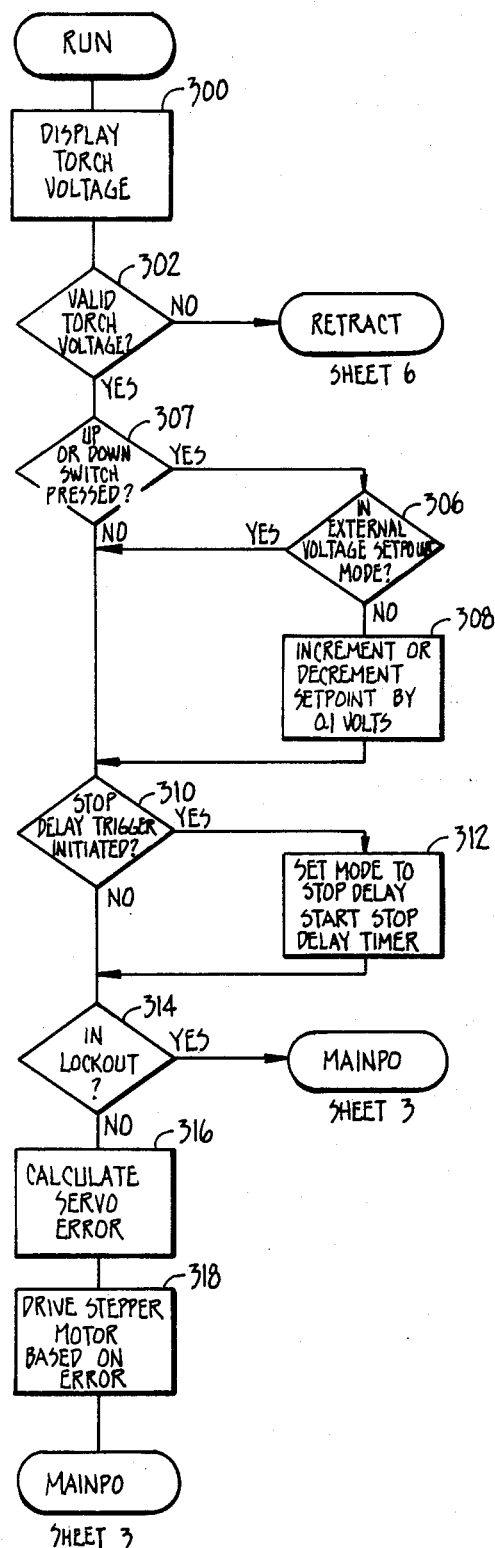
FIG._10.

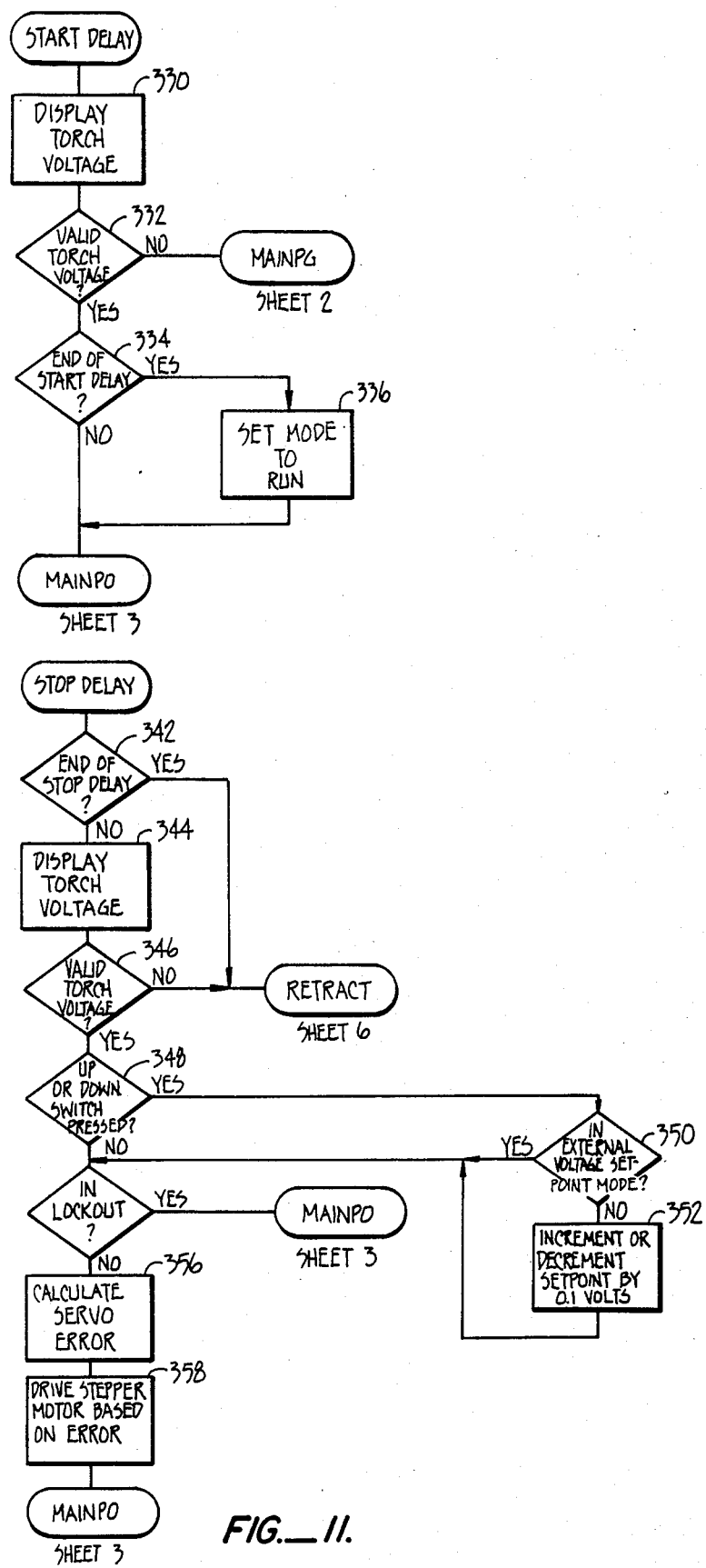
FIG.—11.

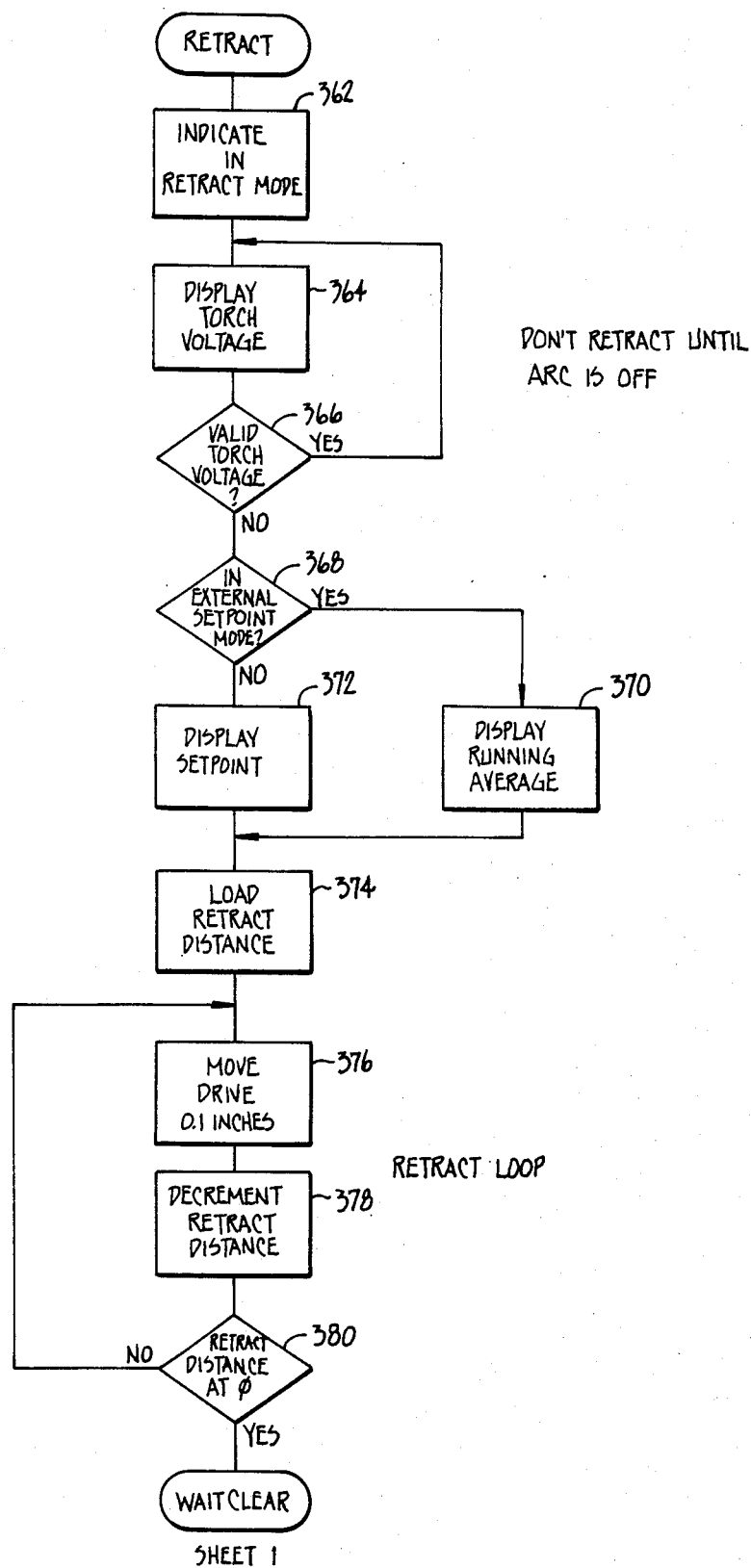
FIG._12.

VOLTAGE CONTROL SYSTEM

BACKGROUND OF THE INVENTION

This invention relates in general to voltage control systems and in particular to a system for controlling the voltage between two objects where the voltage between the objects changes with the distance between them.

In many industrial processes it is desirable to control the amount of power supplied to be at a constant level. In welding, for example, it is frequently desirable to maintain the power supplied to welding torches at a constant level so that heat is supplied to the workpiece at a constant rate to achieve a smooth and even weld. In many welding processes, power sources supplying constant current are used to power the torches. In arc welding the power supplied by the welding torch to the workpiece is proportional to the product of the current and the voltage between the torch and the workpiece. The voltage between the torch and the workpiece may vary with the distance between them, so that when the torch is travelling over a workpiece of uneven height, the varying distance between the torchhead and the workpiece will cause the voltage between them to vary. While the current is kept constant, the voltage between the torch and the workpiece may still change. Thus, even though the power supply may supply a constant current flowing between the torch and workpiece through the arc, the amount of power delivered to the workpiece may still vary if the voltage between the torch and the workpiece varies. It is, therefore, desirable to provide a system to maintain the voltage between the torch and the workpiece at a constant level despite the varying distance between them.

Many conventional torch voltage control systems are analog systems. The reference or setpoint voltage is typically set using a potentiometer, where the desired voltage may, for example, by set by turning a knob. Other necessary parameters are set in a similar manner. Where more than one welding process is to be performed with the same reference voltage and other parameter setting, it is desirable to retain the same setting between two or more welding processes. The same setting is usually retained by simply leaving the knobs in the same positions once they have been set to the desired readings. Like other analog devices, potentiometers and knob settings are subject to drifts and small variations. Thus, while approximately the same settings will be retained for a period of time by leaving the knobs at the same positions, the drifts and small variations will cause the reference voltage and other parameters to wander away from the desired readings, causing inaccuracies in welding.

In conventional torch voltage control systems, an error signal is generated to indicate the deviation of the actual torch voltage from the desired reference voltage, and the distance between the torch and workpiece is corrected to reduce the deviation. In many systems, however, the error signal used for correcting the separation is merely proportional to the magnitude of the deviation of the torch voltage from the reference voltage. The error signal is not available until the torch voltage has already deviated from the reference voltage. Hence, the error voltage will always lag behind the deviation by a following error. Furthermore, such a correction scheme may not allow the error voltage to respond quickly to sudden changes in the separation between the torch and the workpiece. Thus, where the height of the workpiece changes suddenly causing a sudden change in the torch voltage, the torch voltage may differ significantly from the reference voltage.

Stepper motors have been used in conventional torch voltage control systems to move the torch away from or towards the workpiece in order to correct the torch voltage. Stepper motors each has a number of poles whose electromagnetic fields propell coils for making the stepwise movements. Where the number of steps per revolution of the motor corresponds to the number of poles, the motor is said to be operating in the full step mode. Where the number of steps per revolution is twice the number of poles, the motor is said to be operating in the half-step mode. Conventional torch voltage control systems use the stepper motors only in their full step modes. When the torch is close to the workpiece, the full size steps of the stepper motors may increase the chances for the torch to actually touch the workpiece, thereby extinguishing the arc and injecting impurities in the weld. It is therefore desirable to provide a voltage control system where the above described difficulties are alleviated.

SUMMARY OF THE INVENTION

The apparatus of the invention controls the voltage between the work instrument and the workpiece when the instrument moves relative to the workpiece, where the voltage varies with the distance between the work instrument and the workpiece. The apparatus includes a digital microcoded controller means for comparing the voltage difference between the work instrument and the workpiece to a predetermined reference voltage waveform for generating a correction signal. The apparatus also includes a servo means responsive to the correction signal for changing the distance between the work instrument and the workpiece to control the voltage between them.

In a different aspect of the invention, the apparatus for controlling the voltage between the work instrument and the workpiece includes means for comparing the voltage difference between the work instrument and the workpiece to a predetermined reference voltage waveform for generating an error voltage. The apparatus further includes means for generating a correction signal which is the sum of three voltages: a first voltage substantially proporational to the error voltage, a second voltage which is proportional to the time derivative of the error voltage, and a third voltage substantially proportional to the integral of the error voltage over a past predetermined time interval. The apparatus further includes a servo means responsive to the correction signal for changing the distance between the work instrument and the workpiece to control the voltage between them.

In yet another aspect the invention is directed towards a memory means for storing parameters necessary for a digital microcoded controller to control the distance between a work instrument and a workpiece in order to control the voltage between them. The memory means stores such parameters and is powered by a power source separate from the power source for the microcoded controller or the work instrument so that power interruptions in the power supply to the microcoded controller will not cause the memory means to lose the stored parameters.

In still another aspect of the invention, the servo means includes a stepper motor for moving the work instrument towards or away from the workpiece, where the motor may be driven in either the full or half step mode.

BRIEF DESCRIPTION OF THE DRAWINGS.

FIG. 1A is a perspective view of workpiece, a power supply, and a welding torch controlled by an automatic voltage control system to illustrate the invention.

FIG. 1B is a functional block diagram illustrating how the voltage controller of FIG. 1A cooperates with other functional units of a welding system to illustrate the invention.

FIG. 2 is a functional block diagram generally illustrating the functions of a preferred embodiment of the invention.

FIG. 3 is a block diagram of an automatic voltage control system to illustrate the preferred embodiment of the invention.

FIG. 4 is a flowchart diagram illustrating how data on the voltage between the torch and the workpiece is supplied to the automatic voltage control system of FIG. 3 are processed and how various control signals and voltages are generated to illustrate the preferred embodiment of the invention.

FIG. 5 is a data flow block diagram showing how data on the voltage between the torch and the workpiece are processed to illustrate the preferred embodiment of the invention.

FIG. 6 is a graph plotting the current flowing between the torch and the workpiece as a function of time and the correlation between such current and the various modes and control voltages of the automatic control system of FIG. 3 to illustrate the preferred embodiment of the invention.

FIGS. 7-12 are flowchart diagrams illustrating in more detail sections of the flowchart diagram in FIG. 4.

DETAILED DESCRIPTION OF THE PREFERRED EMBODIMENT

FIG. 1A is a perspective view of a workpiece, a power supply, and an automatic voltage control system to illustrate the invention. As shown in FIG. 1., welding torch 20 is held above a workpiece 22 by means of an automatic voltage control drive (AVC drive) 24, which in turn is mounted onto a drive mechanism 26 (only partly shown in FIG. 1A) for moving torch 20 along seam 28. Driving mechanism 26 is controlled by a motor controller (not shown in FIG. 1A), which controls the movement of the torch along the seam. Torch 20 is connected to a welding power supply 34, which, in addition to supplying power, also supplies water and gas to the torch when necessary. AVC Drive 24 is connected to a voltage controller 40. The AVC Drive and the voltage controller together detect the voltage between the welding torch and the workpiece and moves the welding torch away from or towards the workpiece so that the voltage between them follows a predetermined voltage waveform. If so desired, the AVC Drive and the voltage controller maintain a substantially constant voltage difference between the welding torch and the workpiece.

FIG. 1B is a functional block diagram illustrating how the voltage controller cooperates with other functional units of a welding system to illustrate the invention. As shown in FIG. 1B, voltage controller 40 is connected to motor controller 32 for controlling the movement of the welding torch along the seam. Voltage controller 40 may also be connected to an optional system controller 42, which controls an overall system of which the welding and voltage control apparatus of FIG. 1A. is only a part. Controller 40 is also connected to the welding power supply 34 to coordinate the movement of the welding torch caused by the AVC Drive with the power supplied to the welding torch in a manner described below. It will be evident that the voltage controller may be connected with the system controller, motor controller and power supply in configurations other than that shown in FIG. 1B, and that voltage controller may cooperate with other parts of an automated welding system in other manners. Such configurations are within the scope of the invention.

FIG. 2 is a functional block diagram of an automatic control system illustrating the preferred embodiment of the invention. As shown in FIG. 2, the torch voltage is sensed. A microprocessor compares the voltage difference between torch 20 and workpiece 22 to a pre-set reference voltage and generates servo signals. The servo signals are then converted by the processor to step intervals for controlling a step motor drive which moves torch 20 away from or towards workpiece 22 by steps through drive 24. The microprocessor is in communication with a user interface for setting different parameters necessary for the microprocessor to automatically control the voltage difference between the torch and workpiece for manual operation and for other functions described below. While in the preferred embodiment as illustrated in FIG. 2 torch 20 is moved by a stepper motor which adjusts the distance between the torch and workpiece by steps, it will be understood that other types of motor drives which do not move the torch in steps may also be used and are within the scope of the invention.

FIG. 3 is a functional block diagram of the voltage controller of FIG. 1A to illustrate the preferred embodiment of the invention. In the preferred embodiment, all the functional blocks except the high frequency protect filter are contained in the voltage controller 40 of FIG. 1. In the preferred embodiment, the high frequency protect filter 44 is contained in AVC Drive 24 to filter out the high frequency noise caused by the arc between the welding torch and the workpiece in the torch voltage sensed before the torch voltage is supplied to controller 40. After being filtered by filter 44 the torch voltage is further filtered by a torch input buffer 52 and low pass filter 54. In the preferred embodiment workpiece 22 is connected to ground and the torch voltage is measured relative to ground so that the torch voltage gives the voltage difference between the torch and the workpiece. The reference voltage to which the torch voltage is compared is supplied either through an external voltage buffer 56 or a keypad 58. The keypad may be located, for example, on one surface of the controller 40.

Where the reference voltage is supplied through the external voltage buffer 56, an analog switch 62 provides alternate connections to low pass filter 54 and buffer 56. Microprocessor 64 causes switch 62 to toggle between the two connections in order to reach the filtered torch voltage or the reference voltage. Switch 62 is connected to a second analog switch 66 directly and also through an amplifier 68. In the preferred embodiment the amplifier amplifies the voltage passed by switch 62 to switch 66 by a factor of two. The purpose of the amplifier will be described below. It will be understood, however, that other factors of amplification may be used and are within the scope of the invention. Switch 62 toggles between the two connections to switch 62 as directed by microprocessor 64. The voltage passed by switch 66 is then sampled and held in a sample and hold circuit 72 which is converted into a digital signal by A/D converter 74. In such manner, microprocessor 64 controls the reading of the torch voltage and the reference voltage in digital form.

Microprocessor 64 compares the torch voltage to the reference voltage to obtain an error voltage and calculates a correction signal based on the error voltage in accordance with a microcode stored in EPROM 76. It will be understood that other memory devices such as a PROM and ROM may be used for storing the microcode instead of an EPROM and are within the scope of this invention. Also in accordance with the microcode, the correction signal is used to derive command signals to the stepper motor drive 82 for moving the torch away from or towards the workpiece. The command signals are stored in latch 78 and then applied to the stepper motor drive 82. The microprocessor performs such functions in accordance with time intervals indicated by timers 84. Information useful to the user is displayed on display 86 and/or indicators 88. Parameters useful for controlling the torch voltage may be fed to the system through keypad 58 which are then stored in RAM 92 of the CMOS type.

The automatic voltage control system of this invention is versatile. It may be instructed to cooperate with a wide variety of welding systems for controlling the voltage between the torch and the workpiece. Thus, it is capable of effectively and smoothly controlling the torch voltage even though the torch voltage has a pulsed-DC power supply. The system may also be instructed to cooperate effectively with welding systems which stay at an essentially constant DC level throughout the welding process. Alternatively, it can also cooperate with welding systems in which the power supplied has a power up and a power down period. After the welding process on a particular seam or joint is ended, the system of the invention automatically retracts the welding torch away from the workpiece by a preset distance. In order for the system of the invention to cooperate with a wide variety of welding systems, the system provides for the input and storage of a number of parameters which are useful for voltage control or are characteristic of the welding system to be used in conjunction with the system of the invention. The above-described functions and additional functions of the invention will be described in more detail below in reference to FIGS. 4, 5 and 6.

FIG. 4 is a flowchart diagram illustrating how the torch voltage and reference voltage data supplied to the voltage controller are processed and how various control voltages are generated to illustrate the preferred embodiment of the invention. As illustrated in FIG. 4, microprocessor 64 performs various functions in accordance with a microcode stored in EPROM 76 as illustrated by the flowchart. When power to the voltage controller 40 of FIG. 1A is turned on but before welding power supply 34 supplies power to torch 20, the automatic voltage control system of the invention is in a Reset Mode indicated by a bubble 100 in FIG. 4. During the Reset Mode all the hardware blocks of FIG. 3 are initialized and the microprocessor performs power-up tests to test the crucial hardware blocks such as the EPROM and the RAM and test the parameter tables.

If in power up tests hardware failure is detected, the microprocessor will so indicate in a Trap Mode (bubble 102) to wait for the correction of such failure. Typically, at this point, welding power supply 34 is still off so that there is no power applied to the torch. During the Reset Mode the microprocessor also tests whether the torch voltage is within a range of voltages set as one of the parameters and referred to below as the servo window. In the preferred embodiment the servo window is set at 5–50 volts. Since no power is supplied to the torch, the torch voltage will not be in the servo window and the microprocessor will then be in the Wait For Clear Mode (bubble 104). A timer chip containing timers 84 is tested. All display indicators are set to blank. The microprocessor will then be in the Standby Mode in accordance with bubble 106.

During the Standby Mode it is possible to change the parameters stored in the parameter tables in RAM 92 by means of keypad 58. It is also possible to perform diagnostics tests in accordance with the bubbles 108a–108j. The starting distance between the torch and the workpiece may be altered manually by means of up/down switches on the keypad, referred to as jogging drive in bubble 106. The reference or setpoint voltage is also displayed to call the user's attention to the value set. If desired, such setpoint voltage may be altered through the keypad. During the Standby Mode, the microprocessor monitors (bubble 106) the torch voltage and tests if such voltage is within the servo window. Various parameter values may also be displayed so that the user may determine whether such parameters correspond with those required for cooperation with the particular welding system used. If they do not, the parameter values may be changed. Thus, after the torch is brought to a desired distance from the workpiece, and after setting the parameters, including the reference or setpoint voltage to the desired values, the system of the invention is ready for controlling the torch voltage.

Once welding power supply 34 supplies power to the torch voltage, the torch voltage will be detected to be within the servo window. Such event causes the microprocessor to switch from the Standby to the Start Delay Mode (bubble 116). The Start Delay Mode is implemented primarily to allow a predetermined time period for the arc between the torch and the workpiece to stabilize and for adequate heat to be supplied to the workpiece to create a puddle of desired size to initiate welding. During the Start Delay Mode the torch voltage is sensed and displayed. Upon detection of torch voltage within the servo window, a Start Delay Timer is triggered. After a preset Start Delay time period elapses, the event causes the microprocessor to shift to a Run Mode. The Start Delay time period is set as one of the parameters to enable the arc to stabilize and sufficient heat to be supplied to the workpiece.

During the Run Mode (bubble 120), the EOSD Relay is activated and transmitted to motor controller 32 in reference to FIG. 1B. Motor controller 32 then causes mechanism 26 to initiate motion of torch 20 in a direction along seam 28 in reference to FIG. 1A. Also, during the Run Mode, the Start Delay indicator is turned off. During the Run Mode, the microprocessor compares the torch voltage to the reference or setpoint voltage to derive an error voltage and a correction signal in a manner described below in reference to FIG. 5. From the correction signal, command signals are derived for controlling the step motor drive 82, which causes the AVC Drive 24 to move torch 20 away from or towards the workpiece. The torch voltage is displayed and monitored as to whether it stays within the servo window. Whenever the torch voltage leaves the servo window, indicating a power disruption in the welding power supply, the microprocessor will cause the automatic voltage control system of the invention to exit from the Run Mode and enter the Retract Mode and to stop servo action in accordance with algorithms in the Retract Mode (bubble 122).

When the current supplied to torch 20 by the welding power supply 34 is of the pulsed type as shown in FIG. 6, the current supplied to the torch toggles between a high pulse value and a low pulse value, as known to those in the art. A pulsed type power supply may be desirable in some welding processes. During the low pulse period, a reduced amount of power is supplied to the workpiece. This allows the puddle at the weld to cool off to some extent, which permits better control of the welding process. If the current supply to torch 20 is of the pulsed type toggling between the high and the low pulse value, then the torch voltage will also be caused to toggle. If the automatic voltage control system of the invention were to follow such toggling voltage, this would cause the torch to move continuously towards and away from the workpiece, which is undesirable. For this reason, when the pulsed type current supply is applied to the torch, only the high pulse value or the low pulse value of the torch voltage is used for controlling the torch voltage. In the preferred embodiment, the high pulse value is used.

To prevent servo action triggered by the torch voltage during the low pulse value of the pulsed current supply, it is necessary to turn off servo action during the time periods during which the current supply to the torch is at the low pulse value. For this purpose, information on the time periods during which the current supplied is at the low pulse value is supplied from welding power supply 34 to voltage controller 40 as shown schemtically in FIG. 1B. in the form of a lockout input. Thus, during the Run Mode indicated in bubble 120, the microprocessor checks to see if lockout is indicated by power supply 34. If lockout is indicated, then the microprocessor shifts to the Lockout Mode (bubble 124) during which servo action is disabled. The Lockout indicator is turned on. When lockout is not indicated by information from the welding supply 34 through the lockout input, the microprocessor returns to the Run Mode to continue servo action. Voltage controller 40 may also be placed in the Lockout Mode manually during the Run or Stop Delay Modes through inputs to the keypad.

Where no overall system controller, such as system controller 42, is used in reference to FIG. 1B, an operator simply turns off the torch voltage to extinguish the arc when welding of seam 28 (FIG. 1A) is completed. This causes the torch voltage to leave the servo window. Where a system controller is used, it sends a signal to power supply 34, instructing it to reduce power to zero, thereby also causing the torch voltage to leave the servo window. Upon detection of the torch voltage leaving the servo window, the microprocessor exits to the Retract Mode. During the Retract Mode (bubble 122), servo action is stopped. The EOSD Relay is deactivated, causing the motor controller to stop mechanism 26 from further moving the torch. The reference or setpoint voltage is displayed and the torch is retracted for a predetermined distance set as one of the parameters in the parameter table.

Where the voltage controller of the invention cooperates with a system controller such as controller 42 of FIG. 1B, the system controller sends a signal to welding power supply to reduce and then cut off power supply to the torch. System controller 42 also supplies a Stop Delay signal to the voltage controller to end the servo action after a preset time. In such circumstances, the Stop Delay signal from controller 42 would trigger a shift in the voltage controller to the Stop Delay Mode (bubble 126).

Upon entering the Stop Delay Mode, servo action is continued but a Stop Delay timer is triggered and the microprocessor checks for the end of a Stop Delay time period, set as one of the parameters stored in the RAM 92 (FIG. 3). The Stop Delay indicator is turned on. The microprocessor continues to check for lockout input from the welding power supply 34. If a lockout input is detected, the microprocessor shifts to a lockout mode in a manner similar to that described above to enable smoother control of the torch voltage. When the end of the Stop Delay time period is detected, the microprocessor exits the Stop Delay Mode and enters the Retract Mode. Upon such event, the Stop Delay indicator is turned off and the torch voltage is displayed. The operator then turns off power to the torch, causing the torch voltage to leave the servo window. Once this happens, the microprocessor deactivates the EOSD relay, thereby causing motor controller 32 and drive mechanism 26 to stop the motion of the torch in following the seam. The setpoint or reference voltage is once again displayed and the torch is retracted for a preset distance. It will be noted that the torch is not retracted until the torch voltage leaves the servo window so that no unexpected weld will be made during retract. After retract is completed, the system enters the Wait For Clear Mode to re-initialize the hardware system. Thereafter, the system enters the Standby Mode once again so that the system is ready for welding another workpiece.

At any time during the Run Mode, Lockout Mode, or Stop Delay Mode the microprocessor detects that the torch voltage has left the servo window, it causes the system to enter the Retract Mode. In the Retract Mode, the microprocessor will cause the voltage controller to stop servo action in accordance with algorithms in the Retract Mode (bubble 122).

Interruptions in the power supply to the microcoded controller may cause a loss of crucial parameters necessary for operating the system, which may cause the torch arc to damage the workpiece. Moreover, having to reprogram the parameters into the controller each time a power interruption occurs is inconvenient for users. Such adverse effects are alleviated by the invention. When power interruption stops, so that power is once again supplied to the automatic voltage control system of the invention, the system re-enters the Reset Mode. Power interruptions to the hardware functional blocks show in FIG. 3. may cause a loss of memory. The parameters used in controlling the torch voltage are stored in CMOS RAM 92, which has a backup battery. Thus, even though no power is supplied to the system, the battery will maintain the parameters in the parameter tables to prevent them from being lost. Nevertheless, the parameters stored in the RAM may still be affected by power irregularities caused by power interruptions. Thus, whenever power has been interrupted so that the system re-enters the Reset Mode, the parameter tables are tested. When the parameter table is determined to be invalid, default parameters stored in the EPROM 76 will be loaded into the RAM (bubble 132). The system then shifts to Wait For Clear Mode and then to the Standby Mode for manual operation. At such point, welding and voltage control may be initiated with such default parameters. Alternatively, new values for the parameters may be set through the keypad, as described above. Where the power interruption has not disrupted the parameter table to the extent that the parameters cannot be recovered so that the parameter table is valid and that the microprocessor further determines that the torch voltage is in the servo window, it is possible to skip the Wait For Clear, Standby, and Start Delay Modes to re-enter the original mode during which the power interruption occurs (bubble 1349 to save operation time and is convenient to the user. Thus, during the Power Interruption Restart Mode (bubble 134), the microprocessor determines the mode prior to the power interruption so that the system can return to such mode to continue the voltage control process.

Because of the capability to store crucial parameters despite power interruptions, the voltage controller prevents the torch from otherwise damaging the workpiece. Thus, if the parameters cannot be saved through power interruptions, and if the voltage controller does not turn off power to the torch, the arc will become stationary since the EOSD relay will have been turned off. This may damage the workpiece. As described above, the stored parameters allow the system to immediately resume its function so that the arc will not become stationary to damage the workpiece.

Employing a battery backed memory such as RAM 92 is advantageous. In certain analog voltage control systems, the different parameters important for the voltage control process, such as those discussed above, are set through analog devices such as potentiometers where the parameters are set by knobs. In such devices once the parameters are set by moving the knobs to the desired positions the knobs are left in the positions after the welding process is concluded so that the same settings may be retained for the next welding process. While the settings are retained approximately shifts and small variations do occur. Such shifts and variations are avoided in the present invention since the parameters are stored in digital values so that the exact values set are retained.

The digital values stored in the RAM are prevented from being lost when power is turned off from the RAM or during power interruptions by means of a battery backup. Thus once the desired parameter values have been loaded into the RAM such values will be stored indefinitely even when there is serious power interruptions which may affect the values stored in the RAM to some degree. The values stored may still be recovered as described below. Even where the parameter values are totally lost and cannot be recovered, default parameter values stored in the EPROM 76 will be reloaded into the RAM. Thus even in the rare occasions where the stored parameter values in the RAM are totally lost, the default parameters loaded into the RAM enables the system to restart at a known point. The voltage controller of this invention is therefore accurate and convenient for use in the field.

The important parameters for controlling the torch voltage that are stored in the RAM include the operating modes (Start Delay, Run, Stop Delay, Retract, Lockout, ...), the time periods for the start delay timer and the stop delay timer, minimum and maximum allowable setpoint voltages, maximum allowable retract distance setting, servo gain (elaborated below), the current settings for voltage setpoint, retract distance, scale factor and sensitivity (both elaborated below). To further reduce the effects of power interruptions on loss of memory in the RAM all such parameter values are stored in three identical tables in the RAM. When the values of these parameters are modified by input into the keypad the updated values are stored in all three tables to keep the three tables identical. On any application of power, the system is in Reset Mode and the three tables are compared against each other. If different values are found for any parameter in the three tables the errors may be classified in two categories: (1) recoverable (2) non-recoverable.

For any parameter where the values in two of the tables for such parameter match but are different from the value for such parameter in the third table, the error is a recoverable error. To correct the error the two values in the two tables that match are deemed the correct value and the value of the parameter in the third table is corrected to match such value. If the three values of any parameter in the three tables are all different from one another, then a non-recoverable error has occured. Once any non-recoverable error has been found during the Reset Mode, the parameter table is then determined to be invalid so that default parameters will then be loaded into the parameter tables in accordance with bubble 132. If, on the other hand, for all the parameters in the tables, at least two of the values for any parameter match then either no error has been found or only recoverable errors have been found so that the voltage controller determines that the parameter table is valid. The recoverable errors are corrected as described above. In such event the system of the invention will enter the Wait For Clear Mode if the torch voltage is not in the servo window. Alternatively, it will enter the Power Interruption Restart Mode if the torch voltage is found within the servo window.

After default parameters have been reloaded into the three tables the system enters the Wait For Clear Mode regardless of the previous mode before the power interruption. This is necessary since the previous mode cannot be reliably determined without having valid parameter tables. Once the torch voltage leaves the servo window, the system enters the Standby Mode. At this point, the system may be started using the default parameter values. Alternatively, the desired parameter values may be programmed and stored in the RAM during the Standby, Start Delay, Run and Stop Delay Modes. The value of any parameter may be changed. Such new values of the parameters may take effect immediately. Alternatively they may take effect only the next time the system enters the same mode during which the parameter reprogramming was made.

The manner in which the microprocessor derives error voltages, correction signals and command signals to the stepper motor drive will now may be described in reference to FIG. 5. As described above the setpoint or reference voltage may be either set manually through keypad 58 or externally through an external voltage buffer 56. In reference to FIG. 3 where the setpoint voltage is set externally the external setpoint voltage is sent by the system controller 42 to the external voltage buffer 56 within voltage controller 40 in reference to FIG. 1A.

For many welding systems the torch voltage ranges between five to fifty volts. Such voltage range defines the servo window for the voltage control system in the preferred embodiment of the invention. Thus if the torch voltage falls outside the servo window it is assumed that either there is no arc between the torch and the workpiece or that the torch voltage has been turned off. In either case the welding process and the voltage control process should be stopped. While the actual torch voltage may range from five to fifty volts, in many instances during the welding process, the actual torch voltage may remain in the lower part of the voltage range such as between five and twenty volts. Thus it may be desirable to increase the resolution with which the A/D converter 74 samples the torch voltage, so that the torch voltage can be maintained more accurately at a set level with smaller deviations from the set level. Thus if microprocessor 64 determines that the torch voltage is in the range 0 to 19.9 volts, the microprocessor causes switch 66 to be connected to switch 62 through the path including amplifier 68. The microprocessor again samples the torch voltage taking into account this increased gain (referred to as Auto-Range in blocks 152, 154 of FIG. 5). Microprocessor 64 may similarly cause a value equal to twice the external voltage to be read by controlling switch 66 in a similar manner.

In the preferred embodiment voltage controller 40 allows setpoint voltages between 5 and 50 volts. The setpoint voltage may originate from an external source such as the system controller 42. The selection of an external source for setpoint voltage (External Setpoint Mode) is made by flipping the dip switches 70, alerting the microprocessor in controller 40 of such Mode. When controller 40 is in External Setpoint Mode, it is possible to apply the desired setpoint voltage from system controller 42. In the preferred embodiment, the system controller applies a lower voltage to the external voltage buffer 56 in voltage controller 40 and the microprocessor simply multiplies such reduced voltage by an appropriate scale factor to achieve the full range of 5 to 50 volts. For example the setpoint voltage applied by the system controller 42 may range from 0-10 volts and the microprocessor multiplies such voltage by a scale factor of 5. Such an arrangement is convenient since high voltages such as 50 volts otherwise required for the external setpoint input is not generally available whereas lower voltages (e.g. 10 volts) are easier to come by. Furthermore, applying lower control voltages between the system controller and the voltage controller would reduce the risk of shock to the user. The scale factor for multiplying the external setpoint voltage is one of the parameters stored in the RAM.

The sample interrupt timer 150 supplies timing pulses to the microprocessor setting the pace for reading the torch voltage, the external setpoint voltage and the pace for calculating the error and correction signals for controlling the torch voltage. Where the setpoint voltage is not from an external source such as where it is set by input through the keypad, the voltage is simply stored in controller 40 and no reading of the voltage is necessary. Upon receiving a pulse from the sample interrupt timer the microprocessor samples the torch voltage and the external setpoint voltage. The torch voltage and the external setpoint voltage may be read and multiplied by a scale factor (blocks 152-154) when the voltages are determined to be lower than a preset value such as 19.9 volts. The torch voltage is filtered to reduce the effect of power line frequencies. To filter out the power line frequency the torch voltage is sampled for SPC number of times per power line cycle, where SPC is the number of time intervals in each power line cycle. The SPC number of torch voltage samples are then added and divided by SPC to obtain an average value for the torch voltage. In the preferred embodiment the sample interrupt timer supplies a timing pulse every two milliseconds. If the power line frequency is 60 cycles per second, then within each power line cycle there will be 8 torch voltage samples. Thus, during each power line cycle which is approximately 16 milliseconds an average torch voltage will be available for comparison with a setpoint voltage and for generating servo correction signals to move the torch away from or towards the workpiece. It will be understood, of course, that the number of samples taken per power line cycle may be different from 8 and is still within the scope of the invention.

If the reference or setpoint voltage is set through the key pad or is a default value or is set by a device such as up/down switches 80, the torch voltage is simply compared to such reference or setpoint voltage to derive the servo signals. On the other hand, if the reference or setpoint voltage is derived from an external source, such voltage may be subject to the interference of noise such as that caused by the arc or power line frequencies. It is therefore desirable to filter the setpoint voltage from an external source. For this purpose a running average of the external setpoint voltage is calculated at time intervals determined by a health check interrupt timer. In the preferred embodiment the running average is determined every tenth of a second. The running average of the external setpoint average is determined by:

$$Vavg = [OVavg*(TC-1) + V]/TC;$$

where TC is a preset time constant controlling the rate of change of the reference voltage; where Vavg is the average reference voltage for the current time interval; where OVavg is the average reference voltage for the previous time interval; where V is the most recent sample reading from the external setpoint input. See block 162.

During the initial time interval the value of OVavg is 0 so that the value of Vavg is simply V, the sample reading of the external setpoint input during the initial time interval of 0.1 second. During the next time interval the reading from the initial time interval becomes the value of OVavg and the running average of the external setpoint voltage is calculated in accordance with the equation above. If the external setpoint voltage is not expected to change quickly it may be desirable to set the value of TC to be much greater than 1 so that the average external setpoint will change slowly. On the other hand, if the external setpoint voltage is expected to change quickly, the value of TC may be set at a value slightly greater than 1 to allow the average external setpoint to follow closely the most recent sample reading.

Where appropriate the average external set-point voltage Vavg is multiplied by a scale factor such as 5 to achieve a full external voltage setpoint desired as explained above (block 172).

The error voltage and the correction signal are then calculated from a comparison of the reference or setpoint voltage and the average torch voltage from block 160 in accordance with the servo algorithm of block 176. Thus, if the setpoint voltage is from an external source the error voltage tNEWERR is given by:

$$t\text{NEWERR} = [\text{torch voltage} - (V\text{avg} * \text{Scale Factor})].$$

If instead the setpoint voltage is from the key pad or up/down switches or a default value from EPROM 76 the error voltage tNEWERR is given by the difference between the torch voltage and the setpoint voltage from block 156.

From the error voltage calculated as described above, three voltage terms are then calculated, the sum of which will give the correction signal which controls the movement of the torch away from or towards the work piece in order to maintain the torch voltage substantially at the setpoint voltage. The three terms include a proportional term Voffset, a derivative term Vchange and an integral term Vhis. The three terms are frequently known as the PID factors. Such factors are commonly used in control systems. An explanation of a PID controller may be found in "Strategic Design: A Practical Chapter In A Textbook On Control", by E. H. Bristol of the Foxboro Company, Foxboro, Mass., Proceedings of the 1980 Joint Automation Control Conference, Volume I, San Francisco, Calif., August 1980. Controls using the PID factors are well known in servo control theory. See for example the two articles "Simplified Design of Microprocessors Compensators for Digital Servo Systems" by Darryl R. Polk of IBM General Systems Division, Austin, Tex., 9th Annual Symposium on Incremental Motion Control Systems and Devices, Champagne, Ill., June 1980, and "Design of Microprocessor-Based Digital System for DC Motor Speed Control" by Milic R. Stojic, IEEE Transactions on Industrial Electronics, Volume 1E-31, No. 3, August 1984. The above three reference on the PID factors are incorporated herein to define the PID terms and its background for control systems using the PID factors.

The three terms Voffset, Vchange and Vhis are given by:

$$V\text{offset} = \text{SENDP} * t\text{NEWERR};$$

$$V\text{change} = \text{SENSD} * (t\text{NEWERR} - t\text{OLDERR});$$

$$V\text{his} = OV\text{his} + \text{SENIP} * t\text{NEWERR} + \text{SENID} * tV\text{change};$$

$$V\text{out} = V\text{change} + V\text{offset} + V\text{his};$$

where tOLDERR is the error during the previous time interval (the previous 16 milliseconds or 8 time intervals of the sample interrupt timer); where OVhis is the value of Vhis during the previous time interval; where the value of OVhis is zero for calculating Vhis for the very first time interval; and where the terms SENDP, SENSD, SENIP, SENID are the servo gain terms given by the algorithm shown in block 178 of FIG. 5 and reproduced below:

$$\% \text{ gain} = \text{PIDGAIN}/100;$$

$$\text{SENDP} = \% \text{ gain} * \text{PSENDP};$$

$$\text{SENSD} = \% \text{ gain} * \text{PSENSD};$$

$$\text{SENIP} = \% \text{ gain} * \text{PSENIP};$$

$$\text{SENID} = \% \text{ gain} * \text{PSENID}.$$

As can be seen from the five servo gain equations immediately above, all four servo gain terms are formed by multiplying a common gain term, % gain, and the respective constant (PSENDP, PSENSD, PSENIP, PSENID). The value of % gain chosen determines the sensitivity of the movement of the torch as a function of the error voltage. Thus, if % gain is high so that the value of PIDGAIN is closer to 100 the correction signal Vout generated will cause the movement of the torch to be more sensitive to the error voltage than when PIDGAIN is close to 0.

The correction voltage Vout is then used to derive the command signals for the stepper motor drive 82. In accordance with the algorithm in block 190 two quantities are derived from the correction voltage Vout. One of the two quantities is TDUR, the time interval of the step interrupt timer 192 for providing the interrupt pulses which cause the stepper motor to take a step each time it is triggered by a pulse from the timer. The time interval TDUR of timer 192 is given by:

$$T\text{DUR} = (\text{Limit}/V\text{out}) * \text{Minimum timer duration};$$

where Limit is the maximum possible value of Vout.

If the minimum duration is chosen to be large the movement of the torch will lack behind the change in voltage. For such reason, the minimum timer duration is chosen to be small and is 1250 microseconds in the preferred embodiment. It may be undesirable for the torch movement to be too sensitive to minute changes in the correction voltage. The time interval TDUR for triggering the stepper motor is proportional to the ratio Limit/Vout, so that when Vout is small compared to Limit, TDUR is large compared to the minimum time duration to increase the time intervals between steps taken by the stepper motor. To further fine tune the triggering of the stepper motor, a second quantity NSKIP is also calculated. Thus, while the minimum timer duration is chosen to be small timer 192 will send no trigger pulses to the stepper motor unless the quantity NSKIP is 0.

When the correction signal Vout is smaller than a preset voltage both Vout and NSKIP are multiplied by 2 to obtain increased values for Vout and NSKIP. If the increased value of Vout is still smaller than the preset value the process of doubling Vout and NSKIP, and the comparison of the increased Vout to the preset value is repeated until the increased value for Vout is no longer smaller than the preset value. The latest and final value for NSKIP has been used to determine whether the stepper motor should be triggered to take a step. If the time interval of timer 192 is typically much smaller than that of timer 150 from the above description the value of Vout does no change for 8 time intervals of timer 150 or 16 milliseconds during which there may be many time intervals for timer 192. Once a new Vout is available NSKIP and TDUR are calculated. The sign of the correction voltage Vout indicates whether the torch should be driven up or driven down. NSKIP is set to 1 to initialize. The absolute value of Vout is then compared to a preset value. In the preferred embodiment such preset value is half the maximum possible value for the correction signal, or Limit. If the magnitude of the correction signal is smaller than such preset value both the absolute value and NSKIP are doubled and the process repeated until the magnitude of the correction signal is no longer smaller than the preset value. The value of NSKIP so calculated is then decremented upon every timing pulse from timer 192. No trigger pulse is sent to stepper motor drive 82 until NSKIP has been decremented to reach 0. Then one step is taken in the direction indicated by the sign of the correction signal Vout. In this manner, it is possible for the torch movement to expeditiously correct deviations from the set-point voltage but still assure a smooth operation. In the preferred embodiment the minimum timer duration is 1250 microseconds.

A counter is used for storing the final value of NSKIP corresponding to a value of Vout. After the counter is decremented to 0 the counter is reloaded with the final value of NSKIP and the value stored in the counter is decremented by 1 upon every step interrupt pulse from timer 192 so that when the NSKIP is again decremented to 0 another step will be taken.

When the reference of set point voltage is low the torch will be very close to the work piece. In such a situation, if the torch moves by too large a step, it is in danger of touching the work piece. When the torch touches the work piece the welding arc may be extinguished. Furthermore, a part of the torch may be melted and deposited on the work piece thereby injecting impurities into the work piece which is undesirable for high quality welding. Thus, when the reference of set point voltage is low it may be desirable to move the torch by smaller steps. However, to maintain the same sensitivity (that is the sensitivity of torch movement to the error voltage) the time intervals between steps would be reduced to increase the number of steps taken. For this purpose the half step mode of the stepper motor is used. The half step mode in stepper motors is known in those in the art and is described in *Sigma Stepping Motor Handbook,* 1972, Sigma Instruments, Inc. and in the article "Stepping Motors In Industrial Motion Control" Albert C. Leenhouts, 1980, The Superior Electric Co., Proceedings of the 1980 Joint Automatic Control Conference, Volume 1, Aug. 13-15, San Francisco, Calif. Both the handbook and the article are incorporated herein by reference for explanation and background of the half step mode in stepping motors.

The microprocessor compares the reference or set point voltage from either the key pad (block 196) or from the external set point buffer (block 198) to a preset half step threshold. In the preferred embodiment the half step threshold is set at 8½ volts. Thus, if the set point voltage is detected to be equal to or below the half step threshold the system will enter the half step mode instead of the full step mode. In the half step mode the servo algorithm in block 176 remains the same except that the correction voltage Vout is doubled. In the algorithm for calculating the interval for stepper motor in block 190 the absolute value of the correction signal is therefore doubled compared to that in the full step mode. The maximum allowable voltage for Vout, namely Limit, however remains the same. Therefore, it would take half as many cycles for the value of NSKIP to be calculated in the half step mode compared to that in the full step mode. The value of NSKIP in the half step mode is therefore about half that in the full step mode. The step interrupt timer period TDUR is, however, half of that in the full step mode. The step interrupt routine in block 194 remains the same in the half step mode. As compared to the full step mode, however, step interrupt signals are available at twice the frequency of that at full step mode. The size of the steps taken, however, are half that of the full step mode. Furthermore, while the NSKIP is decremented at twice the rate of the full step mode, the value of NSKIP is half that at full step mode. Therefore, essentially the same sensitivity of torch movement as a function of the error voltage is retained. However, it is now possible for half step to be taken to increase the resolution. For example, if the error voltage tNEWERR is such as to cause three full steps to be taken in the full step mode, in the half step mode the actual steps taken may be five or seven half steps which may bring the torch voltage closer to the set point voltage than three full steps.

The application of the automatic voltage control system of the invention will now be described in reference to FIG. 6. FIG. 6 is a graph plotting the current between the torch and the work piece as a function of time and the correlation between such current and the various modes and control voltages of the automatic control system of FIG. 3 to illustrate the preferred embodiment of the invention. In reference to FIGS. 4 and 6 the voltage controller enters the Automatic Mode from the Standby Mode when the welding power supplies power to the torch so that the torch voltage is detected within the servo window. In such event, the voltage controller 40 enters the auto mode for the welding system and the start delay mode. As shown in FIG. 6 the power supplied by power supply 34 is of the pulsed type with an up slope upon initiation and a down slope when power is to be turned off from the torch. Thus, at time t1 the welding system enters the auto mode and the voltage controller enters the start delay mode. The start delay timer is initiated and set point voltage or the value of any one of the parameters is displayed. The welding supply 34 also supplies Lockout input to the voltage controller 40 in reference to FIG. 1B. The waveform of the Lockout input corresponding to the waveform of the pulsed current supply supplied by pulse supply 34 are as shown in FIG. 6. Between times t1 and t3 the Lockout input waveform corresponds to the waveform of the current; when the current is at the high pulse level the Lockout input is low, whereas, when the current is at the low pulse level the Lockout level is high. Between times t3 and t4 however, the Lockout level remains high irrespective of the current level. This indicates that the Lockout input from the external buffer has been overridden by a manual Lockout input from the key pad. This may be desirable where an operator of the system desires to stop servo action for a short time period by overriding the Lockout input from the power supply 34. Between time t5 and t6 the current level remains at a high pulse level causing the Lockout input to be low between times t6 and t9 against the Lockout input follows the waveform of the current. As also shown in FIG. 6 the waveform of the AVC servo follows that of the Lockout input. Thus, whenever Lockout input is high the voltage controller will be in the Lockout mode, thereby turning off all servo action as described above. At time t1 the start delay timer is started the time period set for the start delay timer as one of the parameters is set to coincide with the end of the up slope period for the welding power supply 34. Thus, at time t2 the start delay timer times out and substantially simultaneously the torch current reaches its full operating level. At the end of the start delay time period the EOSD relay is activated to move the torch along the seam in such manner an adequate time period is allowed for the arc to stabilize and for an adequate puddle to form. The torch is moved along the seam to start welding. Where the currents supplied by welding power supply 34 does not have an up slope and starts out at a full operating level it is still desirable to have a start delay time period to allow the arc to stabilize and an adequate puddle to form. In such circumstances the yield EOSD relay is still activated at the end of the start delay time period so that the torch is not moved until the arc has stabilized and an adequate puddle formed. Between times t2 and t7 the voltage controller 40 toggles between the run mode and the Lockout mode as determined by the Lockout input. At time t7 the voltage controller 40 receives a stop delay input from the system controller in reference to FIG. 1B. Substantially simultaneously system controller 42 also sends a voltage downslope signal to the welding power supply 34 causing the current supplied to the torch to down slope. The stop delay signal starts the stop delay timer in the voltage controller which times out at time t8. Thus, at time t8 the voltage controller enters the Retract Mode. Retract, however, is not activated since the torch voltage is still detected to be within the servo window. The welding power supply 34 continues to down slope until at time t9 the torch voltage leaves the servo window. The microprocessor then deactivates the EOSD relay thereby causing motor controller 32 to stop the motion of the torch. The torch is retracted for a preset distance between times t9 and t10. The voltage controller then exits to the Wait For Clear Mode to reset all hardware and enters the Standby Mode, ending the auto mode at time t10.

In reference to FIG. 6, from time t1 to t9, the display function is high, which means that the torch voltage is displayed. When the function is low, as at time t10, the setpoint voltage is displayed.

To further illustrate the operations of the voltage controller 40 in accordance with a microcode, certain parts of the flow chart of FIG. 4 is set forth in more detail in FIGS. 7–12. In reference to FIGS. 4 and 7, when the controller 40 is turned on, the controller is in the reset mode (bubble 100 and elipse 200) In the Reset Mode the hardware system illustrated in FIG. 3 is initialized (block 202) and the hardware is tested (diamond 204). If fatal hardware error is detected the system exits to Trap Mode (bubble 102) and the microprocessor determines whether the hardware has been corrected or reset (diamond 206). The reset loop is repeated until the hardware error has been corrected at which point the microprocessor returns to elipse 200. If no fatal hardware error is detected the microprocessor checks to see if the default values of certain constants and parameters have been requested. The request may be performed through the flipping of dip switchs 70 of FIG. 3. The default parameter values permanently stored in EPROM 76 are then stored in RAM 92. If the default values are not requested the microprocessor checks as to whether the parameter table is valid. If the parameter table is not valid, default parameter values are also loaded into the RAM (block 212). If the parameter table is valid the microprocessor checks as to whether the torch voltage is within the servo window (diamond 214). If the parameter table is valid but the torch voltage is not within the servo window controller 40 then enters the Wait For Clear Mode (bubble 104). Similarly, if the parameter table is not valid so that default values have been loaded into the RAM, the controller also enters the Wait For Clear Mode in which the hardware is readied and the controller waits until the torch voltage goes out of the servo window (block 216, diamond 218) and the microprocessor goes to the point MAINPG of FIG. 8 in the Standby Mode.

If the parameter table is valid and the torch voltage is within the servo window it is assumed that there has been a temporary power interruption which has not disrupted the parameter table or caused the torch voltage to leave the servo window. In such case, the controller 40 enters the Power Interruption Restart Mode (bubble 134) to determine which mode the system is in prior to the power interruption. If the system was not in auto mode before the power interruption the microprocessor goes to the point GOAUTO of FIG. 9. If the system was in one of the auto modes before the power interruption, the microprocessor causes the system to be ready for servo operation (block 224) and the microprocessor checks as to whether the controller was in Start Delay Mode (diamond 226). If the system was in Start Delay Mode the auto and start delay indicators will be turned on and the system goes to the point MAINPO of FIG. 9. If the system was not in Start Delay Mode before the power interruption, the microprocessor checks to see whether the system was in Stop Delay Mode before the interruption. If the system was in such mode the auto and stop delay indicators are turned on. In either case, the microprocessor goes to the point MAINPO (diamond 232, block 234).

The flow chart of FIG. 8 illustrates the algorithm of the Standby Mode. In reference to FIG. 7 the microprocessor is at a point MAINPG when the parameter table is either valid or loaded with default values and the torch voltage is not in the servo window. In the Stand By Mode in reference to FIG. 8 the microprocessor checks and displays any lockout or stop delay input. The external voltage input is sampled to obtain a running average (block 164 of FIG. 5) and multiplied by a scale factor where applicable (block 172). See blocks 242, 244, 246, if the voltage controller 40 receives an external set point voltage from a system controller 42 in reference to FIG. 1B controller 40 is in the external set point mode. The microprocessor checks to see whether the controller is in the external set point mode (diamond 248). If the controller is in such mode, the running average of the external set point voltage multiplied by the scale factor is displayed. If not, the internal set point voltage set through the key pad is displayed instead (blocks 250–252). In the standby mode, it is possible to adjust the distance between the torch and the work piece by pressing an up or down switch, 80 of FIG. 3. The microprocessor checks to see whether the up or down switch has been pressed (diamond 254). If the switch is pressed then the torch is jogged in the direction desired, if the up switch is pressed the torch will move away from the work piece, if the down switch is pressed the torch will move towards the work piece (block 256). If the switch is not pressed or if the switch is no longer pressed, the microprocessor checks for key pad parameter changes programmed through the key pad in the Standby Mode (block 258). Diagnostic tests may be performed if desired (diamond 260, blcok 262, bubbles 108A–108J of FIG. 4) and the system returns to the point MAINPG if diagnostics tests are not desired, the microprocessor determines whether the torch voltage is within the servo window. If the torch voltage is not within the servo window the system returns to the point MAINPG. If a valid torch voltage is found, the system exits to the point GOAUTO of FIG. 9 (diamond 264). At the point GOAUTO, the systesm is ready to control the torch voltage.

In reference to FIG. 9 at the point GOAUTO controller 40 enters the Start Delay Mode (bubble 112 of FIG. 4). In this mode the variables are set up; the torch voltage is displayed and the system is set to Start Delay Mode (a mode which is detectable by the microprocessor as in diamond 226 of FIG. 7). The Start Delay timer is also initialized, see blocks 272–278. The system then is at the point MAINPO also indicated in FIG. 7. The Lockout status is updated and the microprocessor checks for any keypad parameter changes and samples the external voltage input for calculating a running average (blocks 280–284) then the system checks to see whether the controller is in any one of Start Delay, Stop Delay or Retract Modes. If the system is in any one of these three modes, the system exits to the respective mode. The flowchart for the Start Delay and Stop Delay Modes are set forth in FIG. 11. The flowchart for the Retract Mode is set forth in FIG. 12. If none of the three modes is indicated, controller 40 enters the Run Mode further elaborated in FIG. 10.

As shown in FIG. 10, in the Run Mode the torch voltage is displayed (block 300). The microprocessor checks to see whether the torch voltage is within the servo window (diamond 302). If the torch voltage is not valid the system exits to the Retract Mode. If the torch voltage is valid the microprocessor checks to see whether the up or down switch has been pressed, thus, when the system is not in the external voltage set point mode it is possible to change the reference or voltage set point manually through the keypad, thus, if the up or down switch is pressed and the system is not in external set point mode (diamonds 304–306) the set point voltage will be incremented (when the up switch is pressed) or decremented (when the down switch is pressed) by 0.1 volt each time the switch is pressed (block 308). Obviously, the set point voltage may be changed by increments other than 0.1 volt. All such configurations are within the scope of the invention. The microprocessor checks to see whether the Start Delay trigger has been received from system controller 42 of FIG. 1B. 1 If the trigger has been received the microprocessor sets the mode of the controller to the Stop Delay Mode and the Stop Delay timer is initiated (diamond 310, block 312). In either case the microprocessor will check to see whether a Lockout input has been received from power supply 34 of FIG. 1B (diamond 314). If a Lockout input is valid the system exits to the point MAINPO of FIG. 8 thereby skipping the servo action of the Run Mode. If the Lockout input is low servo error is calculated in accordance with the servo algorithm in block 176 of FIG. 5 (block 316). Command signals are then calculated based on the servo error to drive the stepper motor (block 318). Thereafter, the system returns to the point MAINPO of FIG. 9 to determine which mode has been set in controller 40, thus, if the Stop Delay Mode has been set in block 312 the system will go to the point indicated STOP DELAY according to diamond 288 of FIG. 9.

The Stop Delay Mode of FIG. 11 will now be described. In such mode, the torch voltage will be displayed and the microprocessor checks whether the torch voltage is within the servo window (block 330, diamond 332:). If the torch voltage has left the servo window the system exists to the point MAINPG of the Standby Mode in FIG. 8. If the torch voltage is valid, the microprocessor checks for the end of the Start Delay time period (diamond 334). If the Start Delay timer is timed out the system exists to the Run Mode and the microprocessor sets controller 40 to the Run Mode (block 336). If not the system returns to the point MAINPO in the main program of FIG. 9 to determine which mode the system is in.

The Stop Delay Mode will now be described in reference to FIG. 11. The microprocessor checks whether the Stop Delay Timer has timed out (diamond 342). If it has the system exists to the Retract Mode of FIG. 12. If not the torch voltage is displayed and the system checks to see whether the torch voltage is within the servo window. If not the system again exits to the Retract Mode. If the torch voltage is within the servo window the microprocessor checks to see whether the up or down switch has been pressed (diamond 348). If the switch is pressed and the system is not in external voltage set point mode (diamond 350) the set point voltage may be incremented or decremented by 0.1 volts in a manner similar to that in the Run Mode (block 352). If the Lockout input is high the system exits to the point MAINPO of FIG. 9 to determine the mode of the system. If Lockout input is low, servo action is continued (blocks 356–358) and the system returns to the main program at the point MAINPO.

The Retract Mode will now be described in reference to FIG. 12. In the Retract Mode the retract indicators are turned on and the torch voltage is displayed (blocks 362–364). In the Retract Mode in reference to FIG. 12, the Retract volt indicator is turned on (block 362) and the torch voltage is displayed (block 364). The microprocessor determines whether the torch voltage is in the servo window (block 366). If the torch voltage is within the servo window, the system goes back to block 364 and stays in the loop until the torch voltage leaves the servo window. In this manner, retract of the torch is prevented until the torch voltage leaves the servo window. The microprocessor than determines whether the system in in External Set Point Mode (diamond 368). If it is the running average of the external set point voltage is displayed (block 370). If not, the internal set point voltage is displayed (block 372). The retract distance is then loaded from RAM 92 (block 374) the stepper motor drive is than caused to move for a set distance which in the preferred embodiment may be 0.1 inches (block 376). The distance moved is decremented from the Retract distance loaded (block 378) and the microprocessor checks to see whether the Retract distance has been reduced to 0 (diamond 380). If not, the system returns to block 376 to repeat the steps of moving the torch away from the work piece by the set distance and decrementing the Retract distance. After the Retract distance has been decremented to 0 the system exits to the point WAITCLEAR in FIG. 7 so that the system returns to the Wait For Clear and Standby Modes for controlling the torch voltage for another welding process.

MICROFICHE APPENDIX

This application includes one microfiche appendix containing 134 frames. For convenient reference the titles of the routines and subroutines and their listing in the microfiche corresponding to the different modes of the voltage controller in FIG. 4 and the various algorithms for reading the torch voltage, the set point voltage and for calculating the error voltage, the correction signal and the command signals for the stepper motor drive in FIG. 5 are listed below:

| MODES (FIG. 4) | TITLES OF CORRESPONDING ROUTINES |
|---|---|
| Reset (100) | RESET, TABVOTE |
| Wait For Clear (104) | WAITCLR |
| Standby (106) | KEYUPDN, KEYCHG, KEYSTBY |
| Power Interruption Restart (134) | RESE28 TO RESET3 |
| Load Default Parameters (132) | RAMDEF, TABCOPY |
| Diagnostics (108) | KEYSTBY |
| Trap (102) | RESE18 |
| Algorithm (FIG. 5) | |
| Read Torch and Ext. Set Point Voltages (152, 154) and Filtering | SMPLINT INTERRUPT ROUTINE |
| Power Line Frequency (160) Running Average of External Setpoint Voltage | TENHzIN INTERRUPT ROUTINE |
| Servo Gain Terms (178) | RAMCOPY |
| Default Value or Up/ Down Switch or Keypad | RAMDEF, AUTOUPDN |
| Set Value (158) | KEYCHG |
| Half Step Mode Threshold (196) | RAMCOPY |
| Half Step Mode Threshold (198) | VCALC |
| Servo Algorithm (176) | VCALC |
| Scale Ext. Setpoint (172) | READEXT |
| Calculate Time Interval for STepper Motor (190) | VTRANS SUBROUTINE |
| Step Interrupt (194) | STEPINT INTERRUPT ROUTINE |

The above description of method and construction used is merely illustrative thereof and various changes in the detais of the circuitry or algorithm may be within the scope of the appended claims.

We claim:

1. An apparatus for conrolling the voltage between a welding torch and a workpiece when the instrument moves relative to the workpiece, wherein the voltage varies with the distance between the torch and the workpiece, by controlling said distance, said apparatus comprising:
   digital microcoded controller means for comparing the voltage difference between the torch and the workpiece to a predetermined reference voltage waveform for generating a correction signal, said microcoded controller means also controlling the movements of the torch in accordance with a number of preset parameters;
   servo means responsive to the correction signal during each time interval for changing said distance to control the voltage between the torch and the workpiece, said microcoded controller means and said servo means being powered by one or more power supplies;
   a power source substantially independent of said power supplies; and
   first memory means accessible to the microcoded controller means for storing said parameters, said memory means powered by the power source, so that power interruptions in the power supplies will not cause the memory means to lose said stored parameters, wherein the parameters are stored in triplicates in said memory means, and wherein the microcoded controller means is capable of comparing the triplicates of each parameter stored to determine whether the triplicates are substantially all the same defining the condition of no error, or whether two of the triplicates are substantially the same but different from the third defining a recoverable error, or whether the triplicates are all different defining a non-recoverable error, and also capable of correcting each recoverable error by setting the value of the third of the triplicates substantially equal to the value of the remaining two of the triplicates which have substantially the same value.

2. The apparatus of claim 1, further comprising a second memory means for storing default values for the parameters, so that when the microcoded controller determines that there is a non-recoverable error in a parameter, the microcoded controller is capable of setting the value of the parameter stored in the first memory means in triplicates substantially equal to the default value of the parameter stored in the second memory.

3. An apparatus for controlling the voltage between a welding torch and a workpiece when the torch moves relative to the workpiece, wherein the voltage varies with the distance between the torch and the workpiece, by controlling said distance, said apparatus comprising:
   digital microcoded controller means for comparing the voltage difference between the torch and the workpiece to a predetermined periodic reference voltage waveform for generating a correction signal, wherein the microcoded controller compares the voltage difference between the work instrument and the workpiece to periodic segments of the predetermined reference voltage waveform for generating a correction signal; and
   servo means responsive to the correction signal for changing said distance to control the voltage between the torch and the workpiece so that said voltage substantially conforms to the predetermined reference voltage waveform.

4. The apparatus of claim 3, wherein the predetermined reference voltage waveform is substantially a square waveform.

5. An apparatus for controlling the voltage between a welding torch and a workpiece when the torch moves relative to the workpiece, wherein the voltage varies with the distance between the torch and the workpiece, by controlling said distance, said apparatus comprising:
   digital microcoded controller means for comparing the voltage difference between the torch and the workpiece to a predetermined reference voltage waveform for generating a correction signal, wherein the microcoded controller determines whether the voltage difference or reference voltage is below a preset value;
   an amplifier for amplifying the voltage difference or the reference voltage to increase resolution and the accuracy of the voltage control of the apparatus when the microcoded controller determines the voltage difference or reference voltage to be below a preset value; and
   servo means responsive to the correction signal for changing said distance to control the voltage between the torch and the workpiece so that said voltage substantially conforms to the predetermined reference voltage waveform.

6. The apparatus of claim 5, further comprising a switch connecting the amplifier to the microcoded controller, wherein the microcoded controller controls the switch to select between the amplified voltage difference or reference voltage and the corresponding unamplified voltages.

7. An apparatus for controlling the voltage between a welding torch and a workpiece when the torch moves relative to the workpiece, wherein the voltage varies with the distance between the torch and the workpiece, by controlling said distance, said apparatus comprising:
digital microcoded controller means for comparing the voltage difference between the torch and the workpiece to a predetermined reference voltage waveform for generating a correction signal, wherein the microcoded controller derives an averaged value of the voltage difference and an averaged value of the reference voltage over a preset time period before the comparison, and compares the averaged voltages to reduce the effects of noise on the voltage difference or the reference voltage; and
servo means responsive to the correction signal for changing said distance to control the voltage between the torch and the workpiece so that said voltage substantially conforms to the predetermined reference voltage waveform.

8. The apparatus of claim 7, wherein the microcoded controller controls the distance during a sequence of time intervals, compares the voltage difference to the reference voltage during each time interval, and generates a correction signal causing the servo means to move the torch to control the voltage difference during each time interval, and wherein the reference voltage Vavg during each time interval is given by:

$$Vavg = [(OVavg*(TC-1) + V)]/TC;$$

where TC is a preset time constant controlling the rate of change of the reference voltage;
where Vavg is the averaged reference voltage for the current time interval; and
where OVavg is the averaged reference voltage for the previous time interval.

9. An apparatus for controlling the voltage between a welding torch and a workpiece when the torch moves relative to the workpiece, wherein the voltage varies with the distance between the torch and the workpiece, by controlling said distance, said apparatus comprising:
digital microcoded controller means for comparing the voltage difference between the torch and the workpiece to a predetermined reference voltage waveform for generating a correction signal; and
servo means responsive to the correction signal for changing said distance to control the voltage between the torch and the workpiece so that said voltage substantially conforms to the predetermined reference voltage waveform;
wherein the microcoded controller and servo means are powered by a power line having a power line cycle, wherein the microcoded controller controls the distance during a sequence of time intervals, compares the voltage difference to the reference voltage during each time interval, and generates a correction signal causing the servo means to move the torch to control the voltage difference during each time interval, and wherein the voltage of the torch TVavg used to derive the voltage difference during each time interval is given by:

$$TVavg = [tv1 + tv2 + tv3 + \ldots + tv(SPC)]/SPC$$

where tv1, tv2, tv3 are the consecutive torch voltages during the time intervals in each power line cycle, and SPC is the number of time intervals in each power line cycle; so that noise caused by the power line is reduced.

10. An apparatus for controlling the voltage between a welding torch and a workpiece when the torch moves relative to the workpiece, wherein the voltage varies with the distance between the torch and the workpiece, by controlling said distance, said apparatus comprising:
digital microcoded controller means for comparing the voltage difference between the torch and the workpiece to a predetermined reference voltage waveform for generating a correction signal; and
servo means responsive to the correction signal for changing said distance to control the voltage between the torch and the workpiece so that said voltage substantially conforms to the predetermined reference voltage waveform;
wherein the microcoded controller controls the distance during a sequence of time intervals, compares the voltage difference to the reference voltage during each time interval, and generates a correction signal causing the servo means to move the torch to control the voltage difference during each time interval, and wherein the servo means comprises a stepper motor for moving the instrument away from or towards the workpiece stepwise by a substantially constant predetermined distance during each step to maintain the voltage difference between the instrument and the workpiece at a substantially predetermined reference value;
said apparatus further comprising a timer for providing triggering interrupt pulses to the microcoded controller to trigger the stepwise movement of the stepper motor in a manner determined by the controller, wherein the microcoded controller generates the correction signal by first generating an error voltage from a comparison of the difference between the voltage of the instrument and that of the workpiece to the predetermined reference voltage and then generating a correction signal which varies directly with the error voltage and which indicates the sign of the error voltage, wherein the period of the timer varies inversely with the magnitude M of the correction signal, so that when M increases the time durations between consecutive steps decrease, and when M decreases such time durations increase.

11. The apparatus of claim 10, wherein during each time interval the microcoded controller derives a final value for a quantity NSKIP by setting NSKIP initially equal to 1 for each time interval, by comparing the magnitude M of the correction signal of such interval to a preset value L so that when the controller determines that M is less than L, both M and NSKIP are multiplied by a factor F greater than 1 to give new and increased values for M and NSKIP, said new and increased value of M being compared to L, so that both M and NSKIP are increased by sequential multiplications of factor F and the increased value of M compared to L until M is not less than L,
the controller decrementing the final value for NSKIP so reached by 1 each time the controller receives an interrupt pulse from the timer, wherein the microcoded controller causes the stepper motor to move the instrument relative to the workpiece by a step when it determines that the value of NSKIP is 0.

12. An apparatus for controlling the voltage between a torch and a workpiece when the instrument moves relative to the workpiece, wherein the voltage varies with the distance between the torch and the workpiece, by controlling said distance, said apparatus comprising:
means for comparing the voltage difference between the torch and the workpiece to a predetermined reference voltage waveform for generating a correction signal; and
servo means responsive to the correction signal for changing said distance to control the voltage between the torch and the workpiece, said servo means including a stepper motor means, wherein said stepper motor is driven in full-step of half-step mode, wherein the number of steps taken per revolution of the motor is twice the number of poles of the motor;
wherein the comparing means also compares the voltage waveform amplitude to a predetermined half-step threshold, said comparing means causing the stepper motor to be driven in the full-step mode when the amplitude exceeds said threshold, and causing the stepper motor to be driven in the half-step mode when the amplitude is below said threshold.

13. The apparatus of claim 12, wherein said comparing means compares the voltage difference between the torch and the workpiece to a predetermined reference voltage waveform for generating an error voltage, and generates a correction signal which is the sum of a first voltage substantially proportional to the error voltage, a second voltage which is proportional to time derivative of the error voltage, and a third voltage substantially proportional to the integral of the error voltage over a past predetermined time interval.

14. The apparatus of claim 12, wherein said comparing means comprises a microcoded controller.

* * * * *